US009465750B2

(12) United States Patent
Nakada et al.

(10) Patent No.: US 9,465,750 B2
(45) Date of Patent: Oct. 11, 2016

(54) MEMORY PROTECTION CIRCUIT, METHOD AND PROCESSING UNIT UTILIZING MEMORY ACCESS INFORMATION REGISTER TO SELECTIVELY ALLOW ACCESS TO MEMORY AREAS BY VIRTUAL MACHINES

(71) Applicant: Renesas Electronics Corporation, Kawasaki-shi (JP)

(72) Inventors: Yoshiyuki Nakada, Kanagawa (JP); Masayuki Ito, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 399 days.

(21) Appl. No.: 13/859,261

(22) Filed: Apr. 9, 2013

(65) Prior Publication Data

US 2013/0297901 A1 Nov. 7, 2013

(30) Foreign Application Priority Data

May 1, 2012 (JP) .................................. 2012-104579

(51) Int. Cl.
*G06F 12/14* (2006.01)
*G06F 21/78* (2013.01)
(Continued)

(52) U.S. Cl.
CPC ....... *G06F 12/1416* (2013.01); *G06F 12/1441* (2013.01); *G06F 21/78* (2013.01); *G06F 9/30098* (2013.01); *G06F 9/5016* (2013.01); *G06F 12/0284* (2013.01)

(58) Field of Classification Search
CPC ............................. G06F 12/1416; G06F 21/78
See application file for complete search history.

(56) References Cited

U.S. PATENT DOCUMENTS 5,987,557 A 11/1999 Ebrahim ........................ 710/200
8,713,563 B2 4/2014 Kondoh et al. ................... 718/1
(Continued)

FOREIGN PATENT DOCUMENTS

JP 2008-097173 A 4/2008
JP 2009-9232 A 1/2009
(Continued)

OTHER PUBLICATIONS

Extended European Search Report dated Nov. 17, 2014, for application EP 13164879.
(Continued)

*Primary Examiner* — Tuan Thai
*Assistant Examiner* — Glenn Gossage
(74) *Attorney, Agent, or Firm* — McGinn IP Law Group, PLLC

(57) ABSTRACT

A memory protection circuit includes a memory access information register that stores memory access information related to memory areas which can be accessed by respective virtual machines, and an access determination circuit that determines whether to allow the virtual machines to access the memory areas based on a memory address when each of the virtual machines accesses a memory, information related to the virtual machines that access the memory, and the memory access information stored in the memory access information register. The memory access information register may comprise memory area setting registers and memory area allocation registers. A register access information register may indicate register areas which can be accessed by the virtual machines. A virtual machine scheduler or thread scheduler may determine an order of instructions to be executed.

16 Claims, 18 Drawing Sheets

(51) Int. Cl.
*G06F 9/50* (2006.01)
*G06F 12/02* (2006.01)
*G06F 9/30* (2006.01)

(56) References Cited

U.S. PATENT DOCUMENTS

| | | | |
|---|---|---|---|
| 2006/0294519 A1* | 12/2006 | Hattori et al. | 718/1 |
| 2008/0086729 A1 | 4/2008 | Kondoh et al. | 718/1 |
| 2009/0089527 A1* | 4/2009 | Schoenberg et al. | 711/163 |
| 2009/0094429 A1* | 4/2009 | Boule et al. | 711/163 |
| 2009/0138963 A1* | 5/2009 | Sato et al. | 726/17 |
| 2010/0161908 A1* | 6/2010 | Nation et al. | 711/147 |
| 2011/0010483 A1* | 1/2011 | Liljeberg | 711/6 |
| 2011/0047543 A1* | 2/2011 | Mohinder | 718/1 |
| 2011/0099548 A1* | 4/2011 | Shen | G06F 9/45558 718/1 |
| 2011/0145531 A1 | 6/2011 | Kobayashi | |
| 2011/0173412 A1* | 7/2011 | Tabei et al. | 711/213 |
| 2011/0202919 A1* | 8/2011 | Hayakawa et al. | 718/1 |
| 2012/0331465 A1* | 12/2012 | Tanikawa | 718/1 |

FOREIGN PATENT DOCUMENTS

JP  2011-146030 A   7/2011
WO  WO 2012117465 A1 *  9/2012

OTHER PUBLICATIONS

Japanese Office Action dated Nov. 24, 2015 with an English translation, appl. JP 2012-104579.

* cited by examiner

| MEMORY AREA | ADDRESS RANGE | VIRTUAL MACHINE |
|---|---|---|
| MEMORY AREA #0 | a~b | VM#0 |
| MEMORY AREA #1 | c~d | VM#0 |
| MEMORY AREA #2 | e~f | VM#1 |
| MEMORY AREA #3 | g~h | VM#2 |

Fig. 16

| MEMORY AREA | REGISTER ADDRESS RANGE STORING INFORMATION REGARDING EACH MEMORY AREA | VIRTUAL MACHINE |
|---|---|---|
| MEMORY AREA #0 | a' ~b' | VM#0 |
| MEMORY AREA #1 | c' ~d' | VM#0 |
| MEMORY AREA #2 | e' ~f' | VM#1 |
| MEMORY AREA #3 | g' ~h' | VM#2 |

Fig. 18

MEMORY PROTECTION CIRCUIT, METHOD AND PROCESSING UNIT UTILIZING MEMORY ACCESS INFORMATION REGISTER TO SELECTIVELY ALLOW ACCESS TO MEMORY AREAS BY VIRTUAL MACHINES

CROSS-REFERENCE TO RELATED APPLICATIONS

This application is based upon and claims the benefit of priority from Japanese patent application No. 2012-104579, filed on May 1, 2012, the disclosure of which is incorporated herein in its entirety by reference.

BACKGROUND

The present invention relates to a memory protection circuit, a processing unit, and a memory protection method, and for example, to a memory protection circuit, a processing unit, and a memory protection method that control access to memory by each of a plurality of virtual machines.

In general, a processing unit such as a central processing unit (CPU) includes a memory protection mechanism that controls access to memory in order to protect the memory from unauthorized access. The memory protection mechanism is able to set permission/prohibition of writing or reading to or from a predetermined address in a memory space. The memory protection mechanism includes, for example, a memory management unit (MMU) and a memory protection unit (MPU).

Further, there is a virtualization technique which makes a single physical resource (hardware resource) appear as a plurality of resources. By using this virtualization technique, for example, it is possible to operate a plurality of virtual machines (VMs) on one CPU, thereby being able to operate different operating systems (OSs) on the respective virtual machines.

Japanese Unexamined Patent Application Publication No. 2011-146030 discloses a memory protection technique that reduces a decrease in execution efficiency by enabling a direct access to a protection region determined to have high reliability, and suppresses, as an unauthorized access, a direct access to a protection region determined to have low reliability. Japanese Unexamined Patent Application Publication No. 2009-009233 discloses a technique that provides a computer system with high reliability, and in particular, a technique that protects a kernel of an operating system.

SUMMARY

As described in Background, it is possible to operate a plurality of virtual machines on one CPU, for example, with the use of the virtualization technique. In this case, it is possible to operate different OSs and application programs on the respective virtual machines. However, since the virtual machines share a single physical memory, it is required to prevent interference of access to memory by each of the virtual machines when the virtualization technique is used in the CPU. It is therefore required to provide a memory protection mechanism that controls access to memory by each of the virtual machines.

However, when a memory management unit (MMU) that includes a memory protection function and an address conversion function is used, for example, as the memory protection mechanism, it requires a large number of hardware resources. Therefore, a memory protection mechanism (memory protection circuit) that controls access to memory by each of a plurality of virtual machines with a small amount of hardware resources has been required.

Other problems and novel characteristics will be made apparent from the description in the specification and the accompanying drawings.

A memory protection circuit according to one embodiment includes a memory access information register and an access determination circuit. The memory access information register stores memory access information related to memory areas which can be accessed by respective virtual machines, and the access determination circuit determines whether to allow the virtual machines to access the memory areas based on a memory address when each of the virtual machines accesses a memory, information related to the virtual machines which access the memory, and the memory access information stored in the memory access information register.

A processing unit according to one embodiment includes: an arithmetic circuit that executes programs corresponding to respective virtual machines; a virtual machine scheduler that allocates execution time of the programs to the virtual machines; and a memory protection circuit that controls access to a memory by each of the virtual machines.

A memory protection method according to one embodiment includes: storing memory access information related to a memory area that can be accessed by each of a plurality of virtual machines in a memory access information register; and determining whether to allow the virtual machines to access a memory based on a memory address when each of the virtual machines accesses the memory, information related to the virtual machines which access the memory, and the memory access information stored in the memory access information register.

According to the embodiments stated above, it is possible to provide a memory protection circuit, a processing unit, and a memory protection method that are capable of controlling access to memory by each of a plurality of virtual machines with a small amount of hardware resources.

BRIEF DESCRIPTION OF THE DRAWINGS

The above and other aspects, advantages and features will be more apparent from the following description of certain embodiments taken in conjunction with the accompanying drawings, in which:

FIG. 16 is a table showing one example of information stored in a memory access information register included in the memory protection circuit according to the fifth embodiment;

FIG. 18 is a table showing one example of information stored in a register access information register included in the memory protection circuit according to the sixth embodiment.

DETAILED DESCRIPTION

First Embodiment

Figure 1:
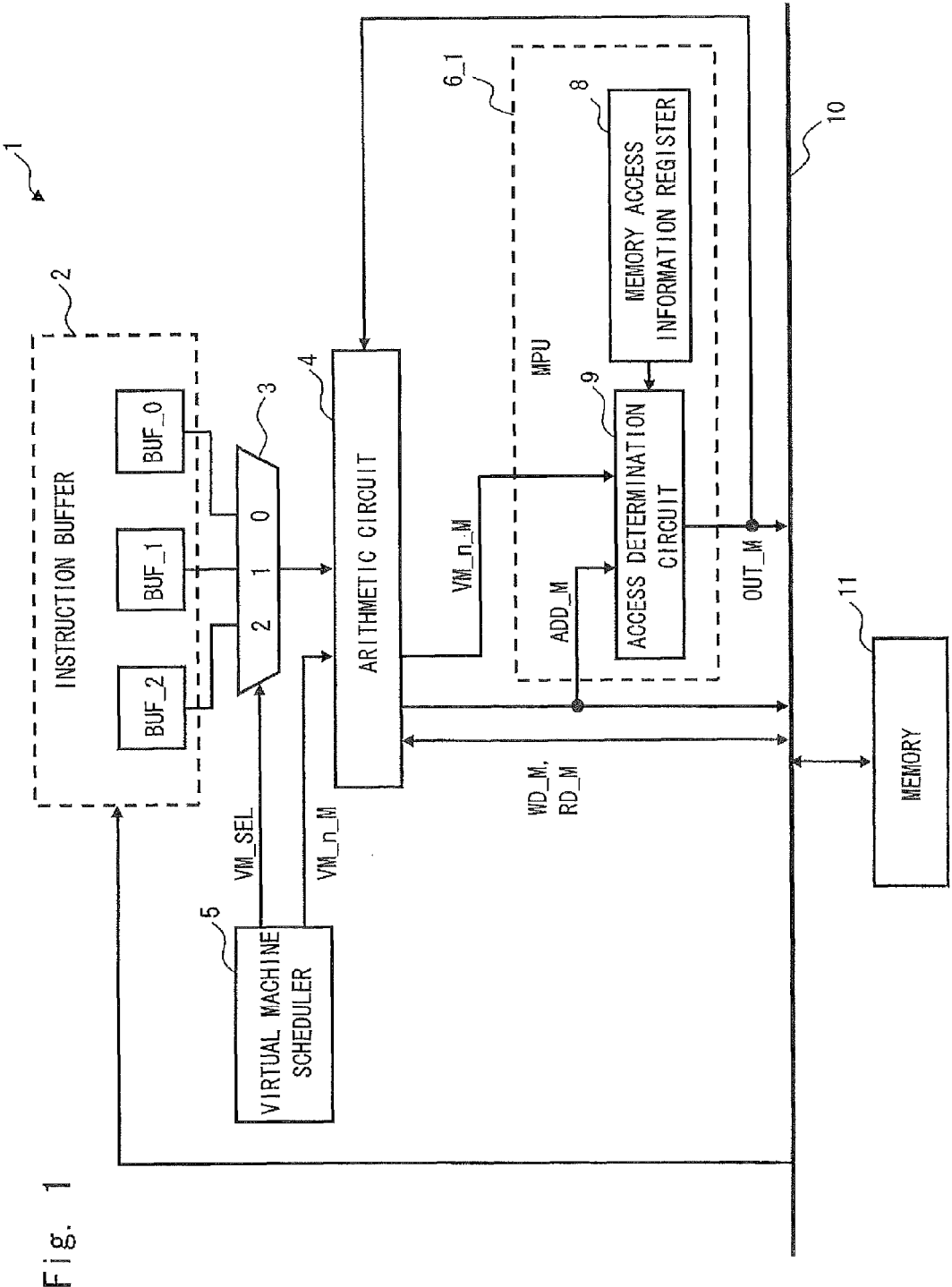
FIG. 1 is a block diagram for describing a processing unit including a memory protection circuit according to a first embodiment.

FIG. 1 is a block diagram for describing a processing unit (CPU) including a memory protection circuit according to a first embodiment. A processing unit 1 shown in FIG. 1 includes an instruction buffer 2, a selector 3, an arithmetic circuit 4, a virtual machine scheduler 5, and a memory protection circuit 6_1. The memory protection circuit 6_1 includes a memory access information register 8 and an access determination circuit 9. The processing unit 1 shown in FIG. 1 is connected to a memory 11 through a bus 10. While description will be made taking a case in which the memory protection circuit 6_1 is included in the processing unit 1 as an example in this embodiment, the memory protection circuit 6_1 may be provided separately from the processing unit 1.

The instruction buffer 2 temporarily stores programs to be processed by the processing unit 1. The instruction buffer 2 includes instruction buffer areas BUF_0 to BUF_2. The instruction buffer areas BUF_0 to BUF_2 temporarily store programs corresponding to respective virtual machines. Instructions (programs) may be supplied to the instruction buffer 2 through the bus 10, for example, or instructions stored in an instruction memory (not shown) may be supplied to the instruction buffer 2.

The selector 3 selects one of the instruction buffer areas BUF_0 to BUF_2 according to a virtual machine selection signal VM_SEL output from the virtual machine scheduler 5, and outputs the program read out from the selected instruction buffer area to the arithmetic circuit 4. Specifically, the selector 3 selects one virtual machine from a plurality of virtual machines (VM#0 to VM#2) according to the virtual machine selection signal VM_SEL, and outputs the program to be executed in the selected virtual machine to the arithmetic circuit 4. Note that the instruction buffer areas BUF_0 to BUF_2 correspond to VM#0 to VM#2, respectively.

The virtual machine scheduler 5 outputs the virtual machine selection signal VM_SEL which specifies the virtual machine to which execution time is allocated in the next execution period among the plurality of virtual machines according to a predetermined schedule. More specifically, the virtual machine scheduler 5 schedules the order of virtual machines corresponding to the programs output from the instruction buffer areas BUF_0 to BUF_2 included in the instruction buffer 2, and outputs the virtual machine selection signal VM_SEL so that the programs are executed by the arithmetic circuit 4 according to this scheduling. Further, the virtual machine scheduler 5 outputs information VM_n_M related to the virtual machine corresponding to the program executed in the arithmetic circuit 4 to the memory protection circuit 6_1 through the arithmetic circuit 4.

The arithmetic circuit 4 executes arithmetic processing based on the program selected by the selector 3. More specifically, the arithmetic circuit 4 includes a plurality of execution stages, and executes arithmetic processing by pipeline processing. Further, the arithmetic circuit 4 transmits a memory address ADD_M and write data WD_M to access the memory 11, and receives read data RD_M according to the result of executing the program. The memory address ADD_M and the write data WD_M transmitted from the arithmetic circuit 4 are supplied to the memory 11 through the bus 10.

Figure 2:
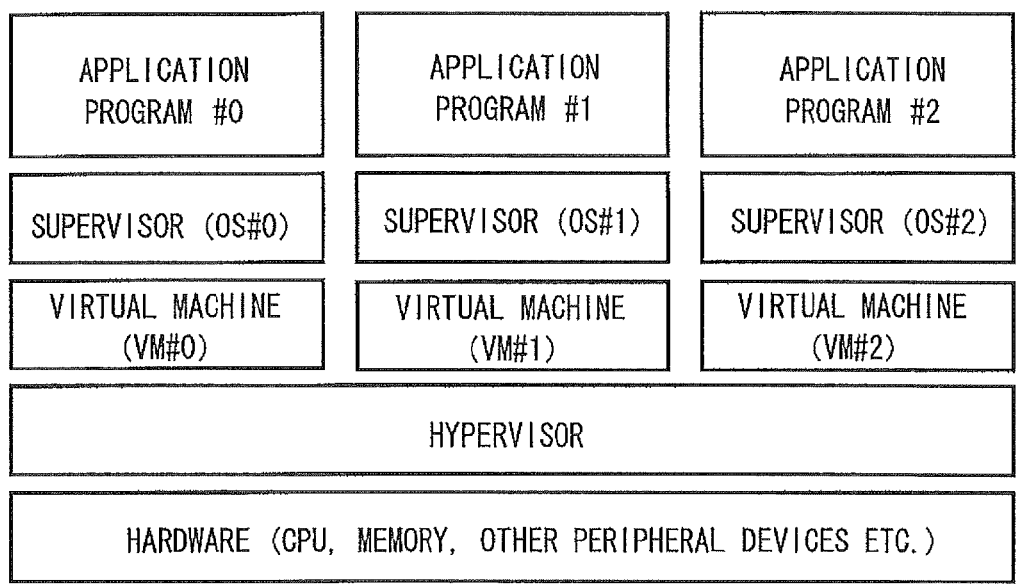
FIG. 2 is a diagram for describing a virtualization technique.

FIG. 2 is a diagram for describing a virtualization technique. The virtualization technique is a technique of making a single hardware resource appear as a plurality of resources. The hardware resources correspond to the processing unit (CPU) 1 and the memory 11 shown in FIG. 1, other peripheral devices and the like. As shown in FIG. 2, a hypervisor is provided in the hierarchy between the hardware resources and the virtual machines. The hypervisor is software which is authorized to manage the plurality of virtual machines (VM#0 to VM#2). Different supervisors (operating systems OS#0 to OS#2) are operated on the respective virtual machines (VM#0 to VM#2). Different application programs #0 to #2 are operated in the respective supervisors (operating systems OS#0 to OS#2). By using the virtualization technique in this way, it is possible to operate the plurality of virtual machines (VM#0 to VM#2) on one processing unit (CPU), thereby being able to operate different operating systems (OS#0 to OS#2) on the respective virtual machines.

Figure 3:
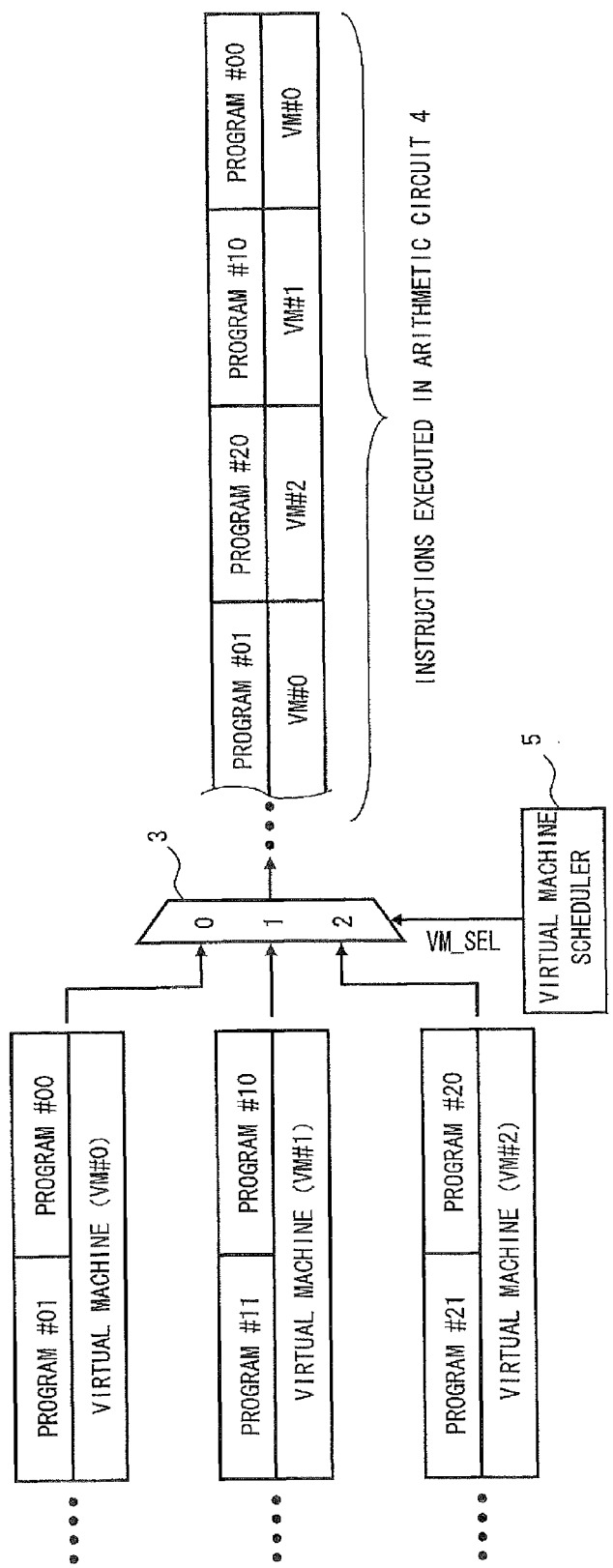
FIG. 3 is a diagram for describing one example of an order of instructions executed by an arithmetic circuit.

FIG. 3 is a diagram for describing one example of the order of programs executed by the arithmetic circuit 4. Programs #00 and #01 (corresponding to the virtual machine #0) shown in FIG. 3 are stored in the instruction buffer area BUF_0 included in the instruction buffer 2. Similarly, programs #10 and #11 (corresponding to the virtual machine #1) are stored in the instruction buffer area BUF_1. Programs #20 and #21 (corresponding to the virtual machine #2) are stored in the instruction buffer area BUF_2.

FIG. 3 shows, as an example, a case in which the programs #00 and #01 are executed on the virtual machine (VM#0), the programs #10 and #11 are executed on the virtual machine (VM#1), and the programs #20 and #21 are executed on the virtual machine (VM#2).

The selector 3 selects anyone of the instruction buffer areas BUF_0 to BUF_2 according to the virtual machine selection signal VM_SEL output from the virtual machine scheduler 5, and outputs the program read out from the selected instruction buffer area to the arithmetic circuit 4. The example shown in FIG. 3 shows a case in which programs stored in the instruction buffer areas BUF_0 to BUF_2 are scheduled in the virtual machine scheduler 5 so as to be output in the order of the program #00, the program #10, the program #20, the program #01, . . . . In this way, the programs output from the selector 3 are sequentially executed using the arithmetic circuit 4, thereby being able to process the respective programs on the plurality of virtual machines (VM#0 to VM#2) scheduled in advance.

Note that the programs processed by the virtual machines and the order of processing the programs shown in FIG. 3 (virtual machine scheduling) are merely examples, and they may be arbitrarily determined.

The memory protection circuit 6_1 shown in FIG. 1 includes the memory access information register 8 and the access determination circuit 9. The memory access information register 8 stores memory access information related to memory areas of the memory 11 which can be accessed by the respective virtual machines. The virtual machine accessing the memory area of the memory 11 is identical to the arithmetic circuit 4 accessing the memory area of the memory 11 when the program corresponding to each of the virtual machines is executed in the arithmetic circuit 4. More specifically, the virtual machine (through arithmetic circuit 4) transmits the memory address ADD_M and the write data WD_M to the memory 11, or receives the read data RD_M from the memory 11, thereby accessing the memory area of the memory 11. In addition to the memory address ADD_M, for example, the information related to the type of access to the memory 11 (write access/read access) and information related to the access width (byte/half word/long word) are also transmitted to the memory 11 and the memory protection circuit 6_1.

Further, the access determination circuit 9 (first access determination circuit) determines whether to allow a virtual machine to access the memory area based on the memory address ADD_M when each of the virtual machines accesses the memory 11, the information VM_n_M related to the virtual machine that accesses the memory 11, and the memory access information stored in the memory access information register 8.

Figure 4:
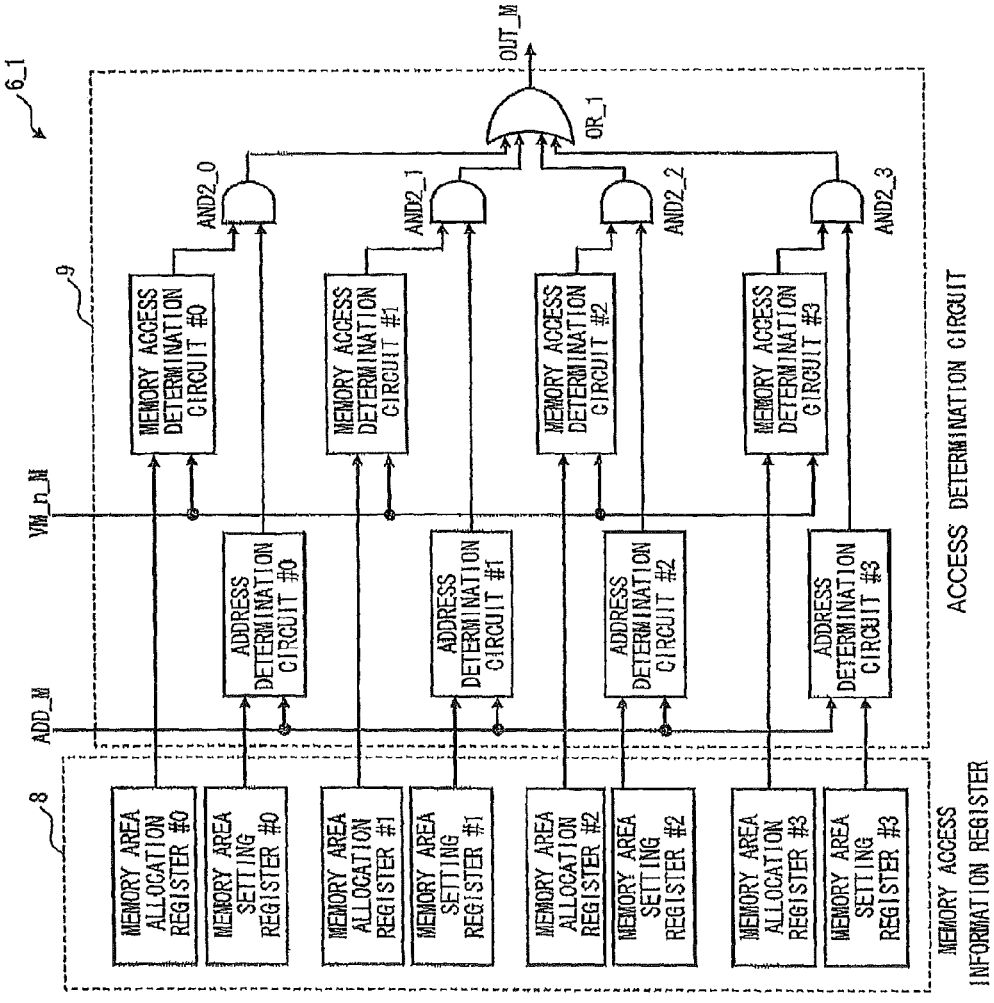
FIG. 4 is a block diagram showing one example of the memory protection circuit according to the first embodiment.

FIG. 4 is a block diagram showing one example of the memory protection circuit 6_1 according to this embodiment. As shown in FIG. 4, the memory access information register 8 includes memory area allocation registers #0 to #3 and memory area setting registers #0 to #3. The memory area information related to the memory areas of the memory 11 is stored in the respective memory area setting registers #0 to #3. In the example shown in FIG. 4, the memory access information register 8 includes four memory area setting registers #0 to #3, and the information related to the four memory areas #0 to #3 of the memory 11 is stored in the memory area setting registers #0 to #3, respectively. In summary, the memory area setting registers #0 to #3 are provided corresponding to the memory areas #0 to #3, respectively.

Figure 5:
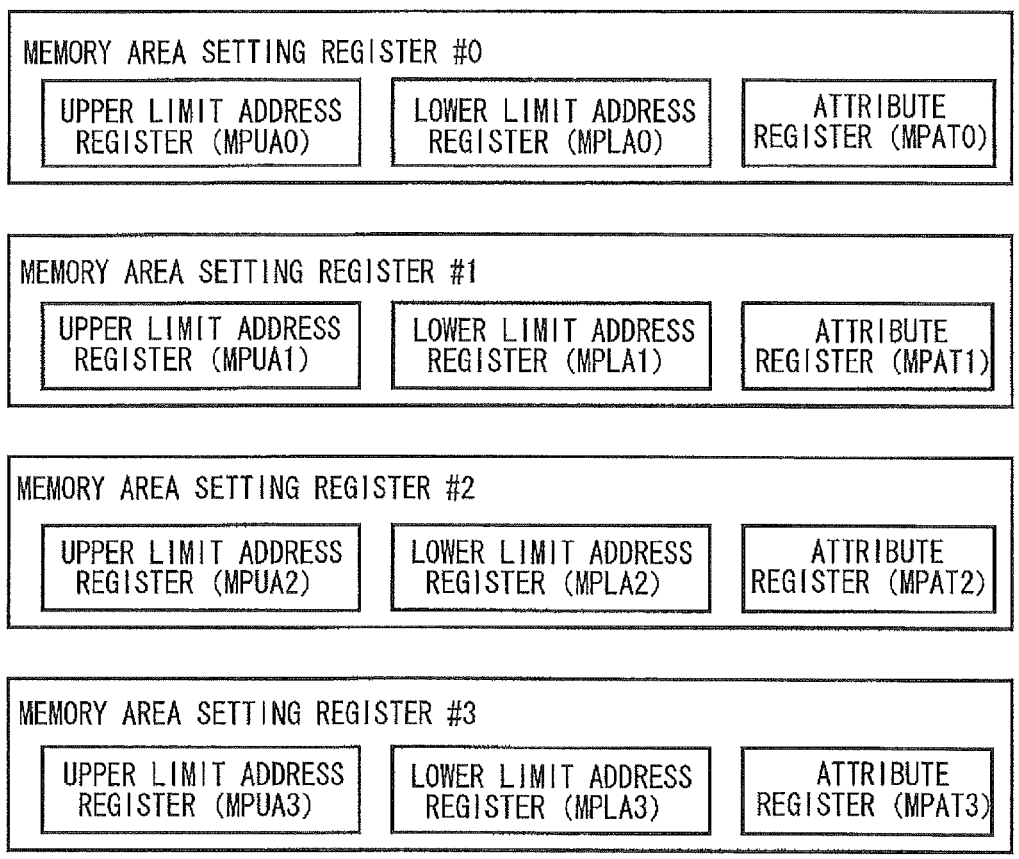
FIG. 5 is a diagram showing one example of memory area setting registers included in the memory protection circuit according to the first embodiment.

FIG. 5 is a diagram showing one example of the memory area setting registers #0 to #3 included in the memory protection circuit 6_1 according to this embodiment. As shown in FIG. 5, the memory area setting registers #0 to #3 each include an upper limit address register (MPUA0 to MPUA3), a lower limit address register (MPLA0 to MPLA3), and an attribute register (MPAT0 to MPAT3).

The upper limit address registers (MPUA0 to MPUA3) respectively store the upper limit addresses of the memory areas #0 to #3. The lower limit address registers (MPLA0 to MPLA3) respectively store the lower limit addresses of the memory areas #0 to #3. For example, when the memory areas #0 to #3 are set as the memory areas of the memory 11, the upper limit address of the memory area #0 is stored in the upper limit address register MPUA0 of the memory area setting register #0, and the lower limit address of the memory area #0 is stored in the lower limit address register MPLA0. The upper limit address of the memory area #1 is stored in the upper limit address register MPUA1 of the memory area setting register #1, and the lower limit address of the memory area #1 is stored in the lower limit address register MPLA1. The upper limit address of the memory area #2 is stored in the upper limit address register MPUA2 of the memory area setting register #2, and the lower limit address of the memory area #2 is stored in the lower limit address register MPLA2. The upper limit address of the memory area #3 is stored in the upper limit address register MPUA3 of the memory area setting register #3, and the lower limit address of the memory area #3 is stored in the lower limit address register MPLA3. At this time, the memory areas #0 to #3 of the memory 11 are typically set so that they are not overlapped with each other. Further, the attribute registers (MPAT0 to MPAT3) store the attributes of the respective memory areas #0 to #3 (i.e., permission/prohibition of writing and permission/prohibition of reading).

The information related to the virtual machines which can access the memory areas #0 to #3 is stored in the respective memory area allocation registers #0 to #3 included in the memory access information register 8 shown in FIG. 4. Specifically, the information related to the virtual machines (VM#0 to VM#2) which can access the memory areas #0 to #3 is stored in the respective memory area allocation registers #0 to #3.

Figure 6:
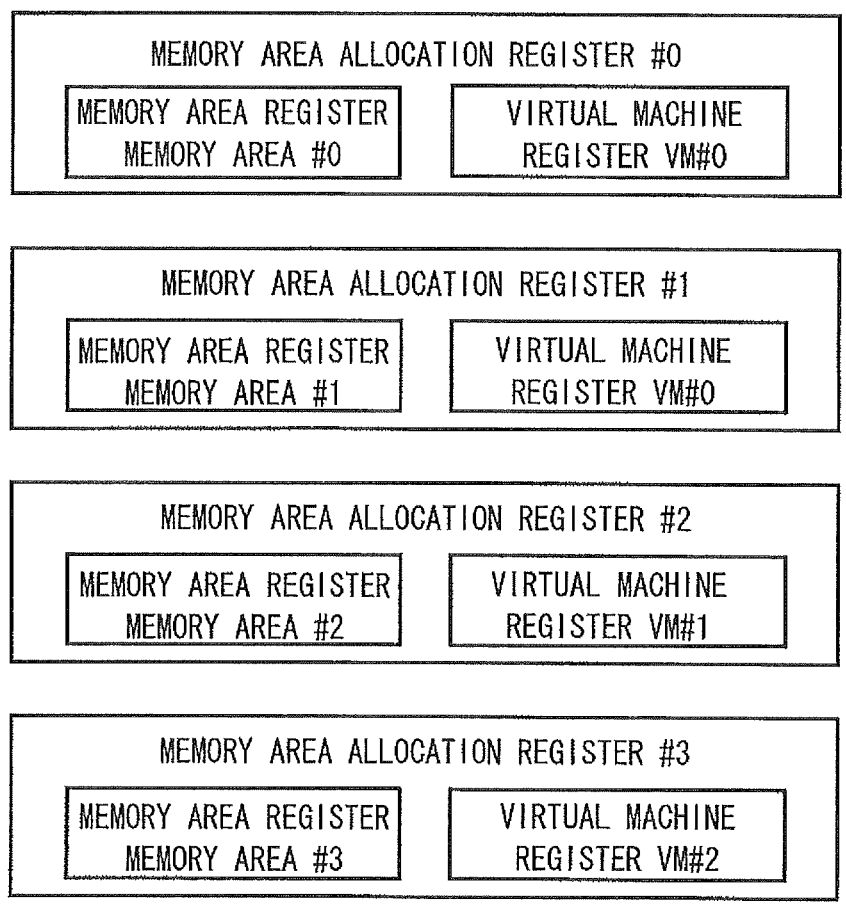
FIG. 6 is a diagram showing one example of memory area allocation registers included in the memory protection circuit according to the first embodiment.

FIG. 6 is a diagram showing one example of the information stored in the memory area allocation registers #0 to #3 included in the memory protection circuit 6_1 according to this embodiment. As shown in FIG. 6, each of the memory area allocation registers #0 to #3 includes a memory area register and a virtual machine register. The information related to the memory areas (memory areas #0 to #3) is stored in the respective memory area registers. Further, information related to the virtual machines (VM#0 to VM#2) which can access the respective memory areas #0 to #3 is stored in the respective virtual machines registers.

In the example shown in FIG. 6, the memory area #0 is stored in the memory area register of the memory area allocation register #0, and the virtual machine VM#0 is stored in the virtual machine register of the memory area allocation register #0. Thus, the virtual machine VM#0 is set as the virtual machine which can access the memory area #0. Further, the memory area #1 is stored in the memory area register of the memory area allocation register #1, and the virtual machine VM#0 is stored in the virtual machine register of the memory area allocation register #1. Thus, the virtual machine VM#0 is set as the virtual machine which can access the memory area #1. Further, the memory area #2 is stored in the memory area register of the memory area allocation register #2, and the virtual machine VM#1 is stored in the virtual machine register of the memory area allocation register #2. Thus, the virtual machine VM#1 is set as the virtual machine which can access the memory area #2. Further, the memory area #3 is stored in the memory area register of the memory area allocation register #3, and the virtual machine VM#2 is stored in the virtual machine register of the memory area allocation register #3. Thus, the virtual machine VM#2 is set as the virtual machine which can access the memory area #3.

For example, only the hypervisor is authorized to access the memory area allocation registers #0 to #3, and each of the virtual machines or OSs (supervisors) is not authorized to access the memory area allocation registers #0 to #3, thereby being able to prevent each of the virtual machines from freely rewriting information in the memory area allocation registers #0 to #3. Accordingly, it is possible for the hypervisor to manage the memory areas used by the respective virtual machines, and it is possible to prevent interference of the memory areas used by the respective virtual machines.

Further, the access determination circuit 9 shown in FIG. 4 includes address determination circuits #0 to #3, memory access determination circuits #0 to #3, AND circuits (AND2_0 to AND2_3), and an OR circuit (OR_1). The address determination circuits #0 to #3 are provided corresponding to the memory area setting registers #0 to #3, respectively. The address determination circuits #0 to #3 determine whether the memory address ADD_M output from each of the virtual machines VM#0 to VM#2 when accessing the memory 11 is included in the memory areas #0 to #3 set in the respective memory area setting registers #0 to #3 based on the memory area information stored in each of the memory area setting registers #0 to #3.

For example, the address determination circuit #0 compares the memory address ADD_M output from each of the virtual machines VM#0 to VM#2 when accessing the memory 11 with the upper limit address and the lower limit address of the memory area #0 stored in the memory area setting register #0. When the memory address ADD_M is within the range of the upper limit address and the lower limit address of the memory area #0, the address determination circuit #0 determines that the memory address ADD_M is included in the memory area #0 set in the memory area setting register #0.

For example, upon determining that the memory address ADD_M is included in the memory area #0 set in the memory area setting register #0, the address determination circuit #0 outputs a high-level signal "1" to the AND2_0. On the other hand, upon determining that the memory address ADD_M is not included in the memory area #0 set in the memory area setting register #0, the address determination circuit #0 outputs a low-level signal "0" to the AND2_0. The address determination circuits #1 to #3 are similar to the address determination circuit #0 described above.

The memory access determination circuits #0 to #3 are provided corresponding to the address determination circuits #0 to #3, respectively. The memory access determination circuits #0 to #3 respectively mask the determination results in the address determination circuits #0 to #3 based on the information related to the virtual machines which can access the respective memory areas #0 to #3 stored in the respective memory area allocation registers #0 to #3 and the information VM_n_M related to the virtual machines that access the memory 11.

Now, the information VM_n_M related to the virtual machine that accesses the memory 11 is supplied to the access determination circuit 9 from the virtual machine scheduler 5 that schedules the order of the virtual machines corresponding to the respective programs through the arithmetic circuit 4. Specifically, the virtual machine scheduler 5 holds information related to the virtual machine corresponding to the program executed in the arithmetic circuit 4. Accordingly, the virtual machine scheduler 5 is able to output the information VM_n_M related to the virtual machine that accesses the memory 11 to the memory access determination circuits #0 to #3.

The memory access determination circuit #0 compares the information VM_n_M related to the virtual machine that accesses the memory 11 output from the virtual machine scheduler 5 with the information related to the virtual machine which can access the memory area #0 stored in the memory area allocation register #0. For example, the memory access determination circuit #0 compares the virtual machine VM#0 which can access the memory area #0 set in the memory area setting register #0 with the information VM_n_M related to the virtual machine that accesses the memory 11 output from the virtual machine scheduler 5.

When the information VM_n_M related to the virtual machine that accesses the memory 11 matches the virtual machine VM#0 which can access the memory area #0 stored in the memory area allocation register #0, the memory access determination circuit #0 determines that the virtual machine VM#0 is able to access the memory 11 and outputs a high-level signal "1" to the AND2_0. When the signal output from the memory access determination circuit #0 is high-level "1", the AND2_0 outputs the determination result output from the address determination circuit #0 to the OR_1 without masking the determination result. In short, the AND2_0 directly outputs the determination result output from the address determination circuit #0 to the OR_1.

On the other hand, when the information VM_n_M related to the virtual machine that accesses the memory 11 does not match the virtual machine VM#0 which can access the memory area #0 stored in the memory area allocation register #0, the memory access determination circuit #0 determines that the access to the memory 11 by the virtual machine is prohibited, and outputs a low-level signal "0" to the AND2_0. When the signal output from the memory access determination circuit #0 is low-level "0", the AND2_0 masks the determination result output from the address determination circuit #0. At this time, the AND2_0 outputs a low-level signal "0" to the OR_1 regardless of the determination result output from the address determination circuit #0.

The memory access determination circuits #1 to #3 are similar to the memory access determination circuit #0 described above. A case in which the data RD_M is read from the memory 11 is also similar to the case described above.

The OR_1 outputs the OR operation result of signals supplied from the AND2_0 to the AND2_3 as a memory access determination result OUT_M. Specifically, when a high-level signal is output from any one of the AND2_0 to AND2_3, the OR_1 outputs a high-level signal indicating access permission as the memory access determination result OUT_M.

The memory access determination result OUT_M output from the memory protection circuit 6_1 is supplied to the memory 11 through the bus 10, for example. When the memory access determination result OUT_M indicates access prohibition (i.e., in the case of low level), the memory 11 disables the access to the memory 11 by the virtual machine (i.e., by arithmetic circuit 4). When the memory access determination result OUT_M indicates access permission (i.e., in the case of high level), the memory 11 enables the access to the memory 11 by the virtual machine (i.e., by arithmetic circuit 4).

The memory access determination result OUT_M output from the memory protection circuit 6_1 may be supplied to the arithmetic circuit 4, for example. In this case, when the memory access determination result OUT_M indicates access prohibition (i.e., in the case of low level), the arithmetic circuit 4 disables the access to the memory 11 by the virtual machine. Meanwhile, when the memory access determination result OUT_M indicates access permission (i.e., in the case of high level), the arithmetic circuit 4 enables the access to the memory 11 by the virtual machine.

Next, access determination in the access determination circuit 9 will be described in detail. First, as an example, a case in which the virtual machine VM#0 accesses the memory area #2 will be described. When the virtual machine VM#0 tries to access the memory area #2, the arithmetic circuit 4 outputs the memory address ADD_M corresponding to the memory area #2 to the address determination circuits #0 to #3. Further, the virtual machine scheduler 5 outputs the information VM_0_M indicating the virtual machine VM#0 to the memory access determination circuits #0 to #3 through the arithmetic circuit 4 as the information VM_n_M related to the virtual machine that accesses the memory 11. Since the memory address ADD_M supplied to the address determination circuits #0 to #3 is the memory address corresponding to the memory area #2, the address determination circuit #2 outputs a high-level signal to the AND2_2. Meanwhile, the address determination circuits #0, #1, and #3 other than the address determination circuit #2 output low-level signals to the AND2_0, the AND2_1, and the AND2_3, respectively.

Further, since the memory areas corresponding to the virtual machine VM#0 are the memory areas #0 and #1 (see FIG. 6), when the information VM_0_M related to the virtual machine VM#0 which accesses the memory 11 is supplied, the memory access determination circuits #0 and #1 output high-level signals to the AND2_0 and the AND2_1, respectively. On the other hand, when the information VM_0_M related to the virtual machine VM#0 which accesses the memory 11 is supplied, the memory access determination circuits #2 and #3 output low-level signals to the AND2_2 and the AND2_3, respectively.

Since the signal output from the memory access determination circuit #2 is low level, the high-level signal output from the address determination circuit #2 is masked by the AND2_2. Thus, a low-level signal is output from the AND2_2. Further, since low-level signals are output from the address determination circuits #0, #1, and #3, each of the AND2_0, the AND2_1, and the AND2_3 outputs a low-level signal. Accordingly, the OR_1 outputs a low-level signal indicating access prohibition as the memory access determination result OUT_M. In this way, the access to the memory area #2 by the virtual machine VM#0 is prohibited.

Another case in which the virtual machine VM#2 accesses the memory area #3 will be described. When the virtual machine VM#2 tries to access the memory area #3, the arithmetic circuit 4 outputs the memory address ADD_M corresponding to the memory area #3 to the address determination circuits #0 to #3. Further, the virtual machine scheduler 5 outputs information VM_2_M indicating the virtual machine VM#2 to the memory access determination circuits #0 to #3 through the arithmetic circuit 4 as the information VM_n_M related to the virtual machine that accesses the memory 11. Since the memory address ADD_M supplied to the address determination circuits #0 to #3 is the memory address corresponding to the memory area #3, the address determination circuit #3 outputs a high-level signal to the AND2_3. On the other hand, the address determination circuits #0 to #2 other than the address determination circuit #3 output low-level signals to the AND2_0 to the AND2_2, respectively.

Further, since the memory area corresponding to the virtual machine VM#2 is the memory area #3, when the information VM_2_M related to the virtual machine VM#2 which accesses the memory 11 is supplied, the memory access determination circuit #3 outputs a high-level signal to the AND2_3. On the other hand, when the information VM_2_M related to the virtual machine VM#2 which accesses the memory 11 is supplied, the memory access determination circuits #0 to #2 output low-level signals to the AND2_0 to the AND2_2, respectively.

Since the signal output from the memory access determination circuit #3 is high level, the high-level signal output from the address determination circuit #3 is not masked by the AND2_3. Accordingly, a high-level signal is output from the AND2_3. Accordingly, a high-level signal indicating access permission is output from the OR_1 as the memory access determination result OUT_M. In this way, the access to the memory area #3 by the virtual machine VM#2 is allowed.

Figure 7:
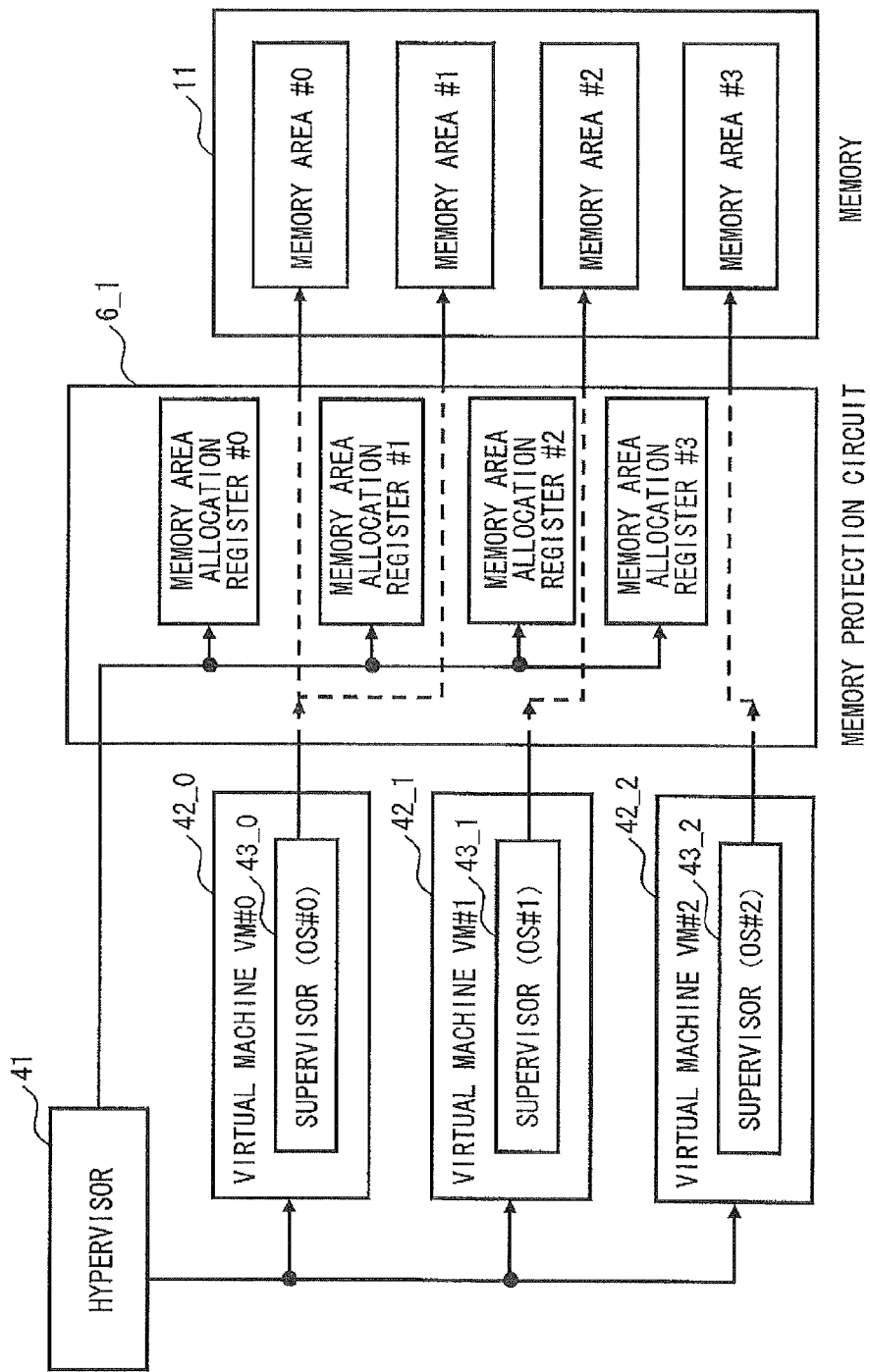
FIG. 7 is a block diagram for describing a system constructed using the virtualization technique.

FIG. 7 is a block diagram for describing a system constructed using the virtualization technique. As shown in FIG. 7, when the virtualization technique is used in the processing unit (CPU) according to this embodiment, a plurality of virtual machines VM#0 to VM#2 (42_0 to 42_2) may be operated using a single hardware resource. Different supervisors 43_0 to 43_2 (operating systems OS#0 to OS#2) are operated on the virtual machines VM#0 to VM#2, respectively.

A hypervisor 41 is authorized to manage the virtual machines VM#0 to VM#2. Further, the hypervisor 41 is authorized to access the memory area allocation registers #0 to #3 of the memory protection circuit 6_1. That is, the hypervisor 41 rewrites the memory area allocation registers #0 to #3 of the memory protection circuit 6_1, thereby being able to arbitrarily set the memory areas #0 to #3 that can be accessed by the respective virtual machines VM#0 to VM#2.

Figure 8:
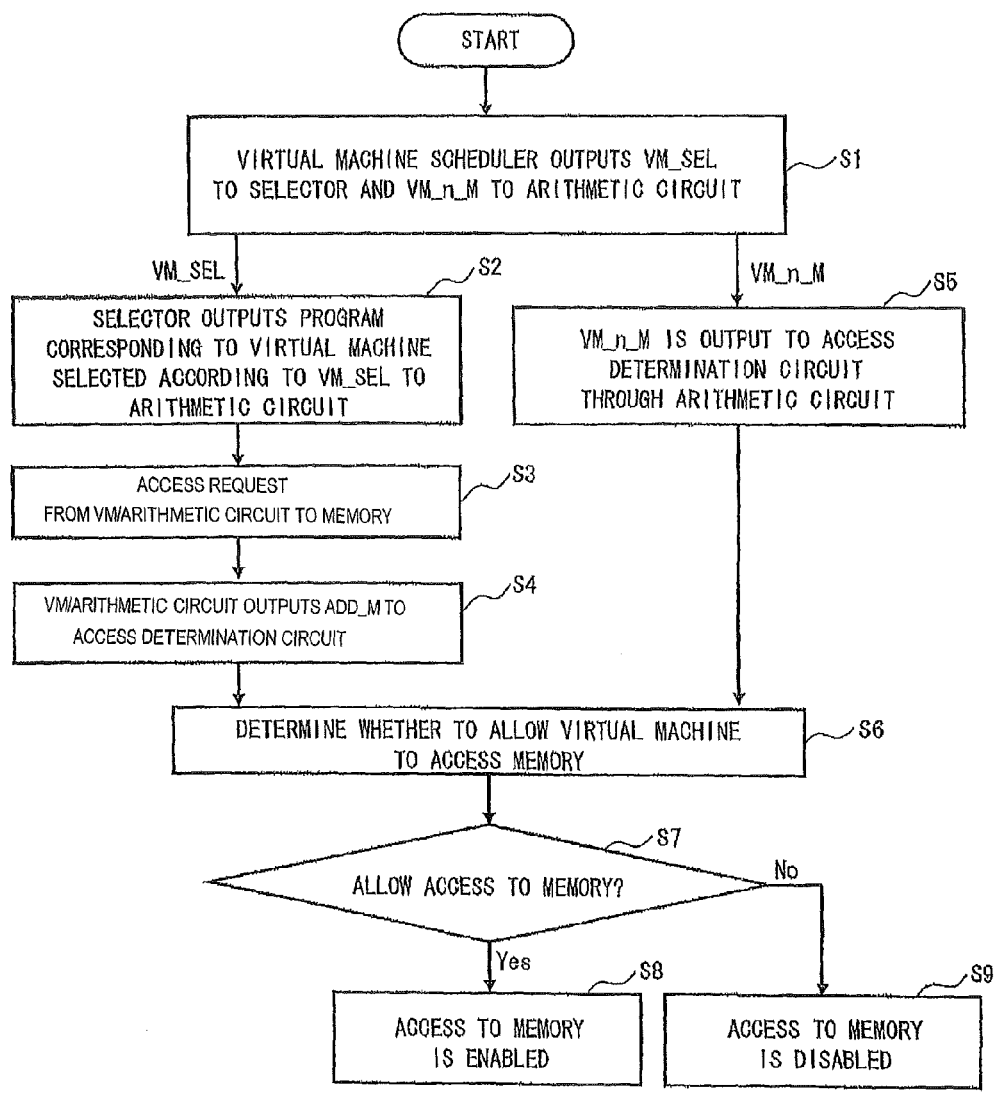
FIG. 8 is a flowchart for describing an operation of the memory protection circuit according to the first embodiment.

Next, with reference to FIG. 8, an operation in which the access to the memory 11 by the virtual machine (i.e., by arithmetic circuit 4) is controlled using the memory protection circuit 6_1 will be described. While described below as an example is an operation in which the virtual machine (i.e., by arithmetic circuit 4) writes information into the memory 11, an operation in which the virtual machine reads information from the memory 11 is similar as well.

The virtual machine scheduler 5 outputs the virtual machine selection signal VM_SEL which specifies the virtual machine to which execution time is allocated to the selector 3 according to a predetermined schedule. Further, the virtual machine scheduler 5 outputs the information VM_n_M related to the virtual machine corresponding to the program executed in the arithmetic circuit 4 to the arithmetic circuit 4 (step S1). The selector 3 outputs the program corresponding to the virtual machine selected according to the virtual machine selection signal VM_SEL to the arithmetic circuit 4 (step S2).

When the program is executed in the virtual machine (i.e., in arithmetic circuit 4), the virtual machine (i.e., arithmetic circuit 4) makes an access request to the memory 11 (step S3). When making the access request to the memory 11, the virtual machine (i.e., by arithmetic circuit 4) outputs the memory address ADD_M to the access determination circuit 9 of the memory protection circuit 6_1 (step S4). Further, the information VM_n_M, which is related to the virtual machine which accesses the memory and is output from the virtual machine scheduler 5 output to the access determination circuit 9 through the arithmetic circuit 4 (step S5). The access determination circuit 9 determines whether to allow the virtual machine to access the memory 11 (step S6).

Specifically, the address determination circuits #0 to #3 included in the access determination circuit 9 determine whether the memory address ADD_M output from each of the virtual machines VM#0 to VM#2 when accessing the memory 11 is included in the memory areas #0 to #3 set in the respective memory area setting registers #0 to #3, based on the memory area information stored in each of the memory area setting registers #0 to #3. At this time, when it is determined that the memory address ADD_M is included in the memory areas set in the memory area setting registers #0 to #3, the address determination circuits #0 to #3 output a high-level signal "1".

Further, the memory access determination circuits #0 to #3 respectively mask the determination results in the address determination circuits #0 to #3 based on the information related to the virtual machines which can access the respective memory areas stored in the respective memory area allocation registers #0 to #3 and the information VM_n_M related to the virtual machines that access the memory 11.

When the access determination circuit 9 allows the virtual machine to access the memory 11 (step S7: Yes), the access to the memory 11 by the virtual machine is enabled (step S8). Specifically, the write data WD_M is written in the memory address ADD_M of the memory 11. On the other hand, when the access determination circuit 9 prohibits the access to the memory 11 by the virtual machine (step S7: No), the access to the memory 11 by the virtual machine is disabled (step S9).

Specifically, when a high-level signal is output from one address determination circuit of the address determination circuits #0 to #3 and a high-level signal is output from the memory access determination circuit corresponding to the address determination circuit from which the high-level signal is output, the access determination circuit 9 allows the virtual machine to access the memory 11. In this case, a high-level signal is output as the memory access determination result OUT_M, and the access to the memory 11 by the virtual machine is enabled.

On the other hand, when a high-level signal is output from one address determination circuit of the address determination circuits #0 to #3 and a low-level signal is output from the memory access determination circuit corresponding to the address determination circuit from which the high-level signal is output, the access determination circuit 9 prohibits the access to the memory 11 by the virtual machine. In this case, a low-level signal is output as the memory access determination result OUT_M, and the access to the memory 11 by the virtual machine is disabled.

As described in Background, it is possible to operate a plurality of virtual machines on one CPU, for example, with the use of the virtualization technique. In this case, it is possible to operate different OSs and application programs on the respective virtual machines. However, since the virtual machines share a single physical memory, it is required to prevent interference of access to memory by each of the virtual machines when the virtualization technique is used in the CPU. It is therefore required to provide a memory protection mechanism that controls access to memory by each of the virtual machines.

However, when a memory management unit (MMU) that includes a memory protection function and an address conversion function is used, for example, as the memory protection mechanism, it requires a large number of hardware resources. Therefore, a memory protection mechanism (memory protection circuit) that controls access to memory by each of the virtual machines with a small amount of hardware resources has been required.

In the memory protection circuit 6_1 according to this embodiment, the memory access information related to the memory areas which can be accessed by the respective virtual machines is stored in the memory access information register 8. Further, it is determined whether to allow the virtual machine to access the memory area based on the memory address ADD_M when each of the virtual machines accesses the memory 11, the information VM_n_M related to the virtual machine that accesses the memory 11, and the memory access information stored in the memory access information register 8 using the access determination circuit 9. According to this embodiment, it is possible to provide a memory protection circuit which can control access to memory by each of a plurality of virtual machines with a small amount of hardware resources.

For example, the processing unit (CPU) includes a microprocessor used in a personal computer or the like and a microcontroller whose function is specialized to control the electronic devices mounted thereon. Since the microprocessor deals with a relatively large amount of memory, a memory management unit (MMU) including the memory protection function and the address conversion function is often mounted as the memory protection mechanism.

The memory management unit (MMU) receives a virtual address from the microprocessor and converts the virtual address into a physical address. In a recent memory management unit (MMU), a translation lookaside buffer (TLB) is included in order to increase the speed of the conversion of a virtual address into a physical address. The TLB includes a page table entry used to convert a virtual address into a physical address. A virtual address space is a memory space seen from the process, and is divided into fixed-sized pages. A page table stores information in which the virtual page and the position on the physical memory are associated with each other.

When accessing the memory space, the microprocessor searches the TLB using the virtual address, and if there is an entry corresponding to the virtual address in the TLB, the microprocessor sends back the corresponding physical address as a searched result (TLB hit). Meanwhile, when there is no entry corresponding to the virtual address in the TLB (TLB miss hit), it is required to search the corresponding entry from the page table stored in the memory (space that stores the page table entry which cannot be stored in the TLB). This is called table walk. After the physical address is acquired by table walk, mapping of the physical address and the virtual address is stored in the TLB. Since it is required in the table walk to read out the contents of the memory in a plurality of positions and to calculate the physical address, it takes time to perform processing.

On the other hand, since the function of the microcontroller is specialized to control the electronic devices mounted thereon, there is no need to mount a large amount of memory and an address conversion function to convert a virtual address into a physical address is not necessary. Further, power saving and small area are required in the microcontroller. Accordingly, when the memory management unit (MMU) is mounted as the memory protection mechanism of the microcontroller, overhead of hardware resources is increased.

Further, since the microcontroller is used to control electronic devices, real-time property or operation is important. However, when the memory management unit (MMU) is mounted as the memory protection mechanism of the microcontroller, table walk occurs in the case of TLB miss hit and it takes time to perform processing, which impairs the real-time property or operation.

Accordingly, as the memory protection mechanism of the microcontroller, the memory protection unit (MPU) which does not include the address conversion function is preferably used rather than the MMU including the address conversion function. Accordingly, the memory protection circuit according to this embodiment is particularly suitable in a microcontroller in which power saving, small area, and real-time property or operation are important. Specifically, in this embodiment, the memory address ADD_M output from the arithmetic circuit 4 is a physical address. Thus, the memory protection circuit 6_1 is able to output the physical address to the memory 11 without converting the physical address.

The memory protection circuit according to this embodiment may be applied to a memory protection circuit including an address conversion function, and may also be applied to a microprocessor including a memory management unit (MMU) including an address conversion function, for example. The memory protection circuit according to this embodiment may also be applied to a microprocessor which does not require the address conversion function, for example.

According to this embodiment described above, it is possible to provide a memory protection circuit, a processing unit, and a memory protection method that are capable of controlling access to memory by each of a plurality of virtual machines with a small amount of hardware resources.

Second Embodiment

Figure 9:
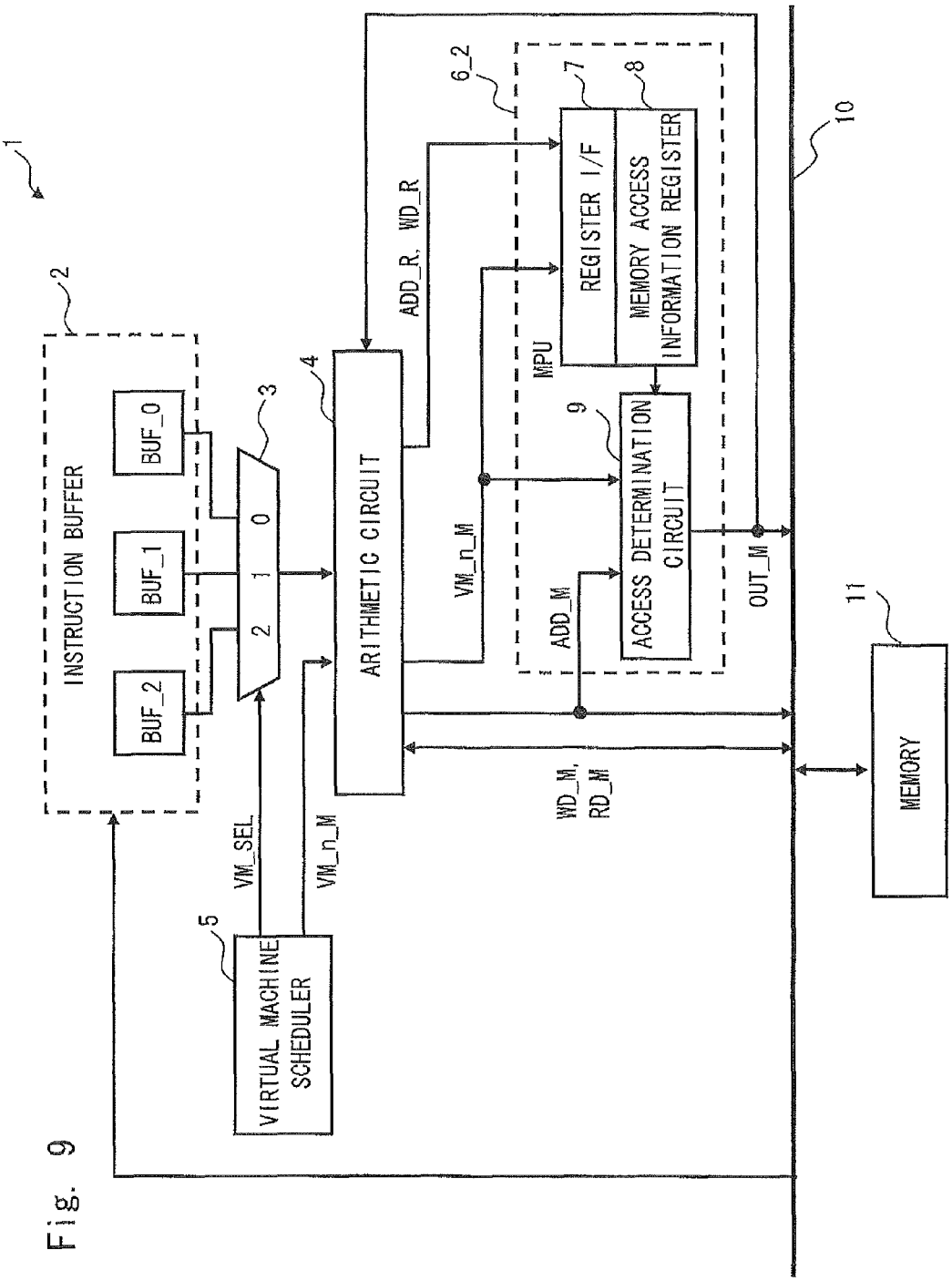
FIG. 9 is a block diagram for describing a processing unit including a memory protection circuit according to a second embodiment.

Next, a second embodiment will be described. FIG. 9 is a block diagram for describing a processing unit including a memory protection circuit according to this embodiment. In this embodiment, as is different from the memory protection circuit described in the first embodiment, a memory protection circuit 6_2 includes a register I/F (7). Other configurations are similar to those of the first embodiment. Thus, the same components are denoted by the same reference symbols, and overlapping description will be omitted.

A processing unit 1 shown in FIG. 9 includes an instruction buffer 2, a selector 3, an arithmetic circuit 4, a virtual machine scheduler 5, and the memory protection circuit 6_2. The memory protection circuit 6_2 includes the register I/F (7), a memory access information register 8, and an access determination circuit 9.

Figure 10:
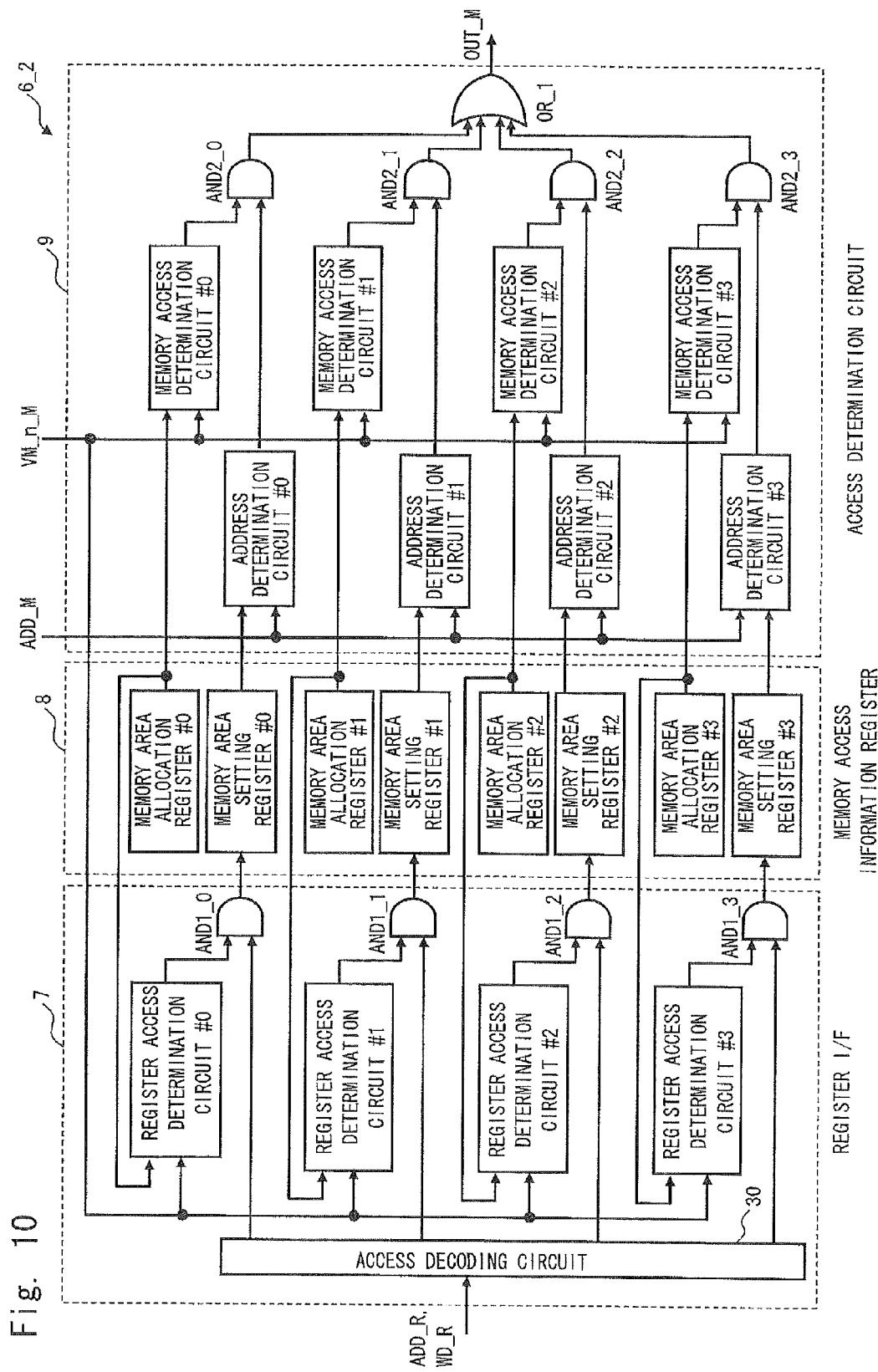
FIG. 10 is a block diagram showing one example of the memory protection circuit according to the second embodiment.

FIG. 10 is a block diagram showing one example of the memory protection circuit 6_2 according to this embodiment. The register I/F (7) includes an access decoding circuit 30, register access determination circuits #0 to #3, and AND circuits (AND1_0 to AND1_3). The virtual machines access the respective memory area setting registers #0 to #3, thereby being able to write/read data into/from the upper limit address registers (MPUA0 to MPUA3), the lower limit address registers (MPLA0 to MPLA3), and the attribute registers (MPAT0 to MPAT3) of the memory area setting registers #0 to #3. The register I/F (7) is a circuit to control the access to the memory area setting registers #0 to #3 by the respective virtual machines.

When the virtual machines access the memory area setting registers #0 to #3, the virtual machines (or arithmetic circuits 4) each transmit the register address ADD_R and the write data WD_R to the register I/F (7). Further, the virtual machine scheduler 5 outputs the information VM_n_M related to the virtual machine corresponding to the program executed in the arithmetic circuit 4 to the register I/F (7). The access to the memory area setting registers #0 to #3 by the virtual machines is performed by the program executed in the arithmetic circuit 4.

The access decoding circuit 30 receives the register address ADD_R and the write data WD_R output from the virtual machine (i.e., by from arithmetic circuit 4), and outputs the register address ADD_R and the write data WD_R to the memory area setting registers #0 to #3 (i.e., via AND1_0 to AND1_3) corresponding to the received register address ADD_R. Specifically, different register addresses ADD_R are included in the respective memory area setting registers #0 to #3, and the access decoding circuit 30 controls the access to the memory area setting registers #0 to #3 according to the received register address ADD_R.

For example, the access decoding circuit 30 separates the address information and the information of data to be written from the information of the register address ADD_R and the write data WD_R that are input, and performs decoding so that information is appropriately input to the memory area setting registers #0 to #3 via the AND_1_0 to AND_1_3 that are provided at the previous stage of the memory area setting registers #0 to #3.

The register access determination circuits #0 to #3 are provided corresponding to the memory area setting registers #0 to #3, respectively. Each of the register access determination circuits #0 to #3 determines whether to allow the virtual machines to access the memory area setting registers #0 to #3, respectively, based on the information, related to the virtual machines which can access the respective memory area setting registers #0 to #3, stored in the respective memory area allocation registers #0 to #3 and the information VM_n_M related to the virtual machines which access the memory area setting registers #0 to #3.

The information VM_n_M related to the virtual machines which access the respective memory area setting registers #0 to #3 is supplied to the register access determination circuits #0 to #3 from the virtual machine scheduler 5 which schedules the order of the virtual machines corresponding to the respective programs through the arithmetic circuit 4. Specifically, the virtual machine scheduler 5 holds information related to the virtual machine corresponding to the program executed in the arithmetic circuit 4. Accordingly, the virtual machine scheduler 5 is able to output the information VM_n_M related to the virtual machines which access the respective memory area setting registers #0 to #3 to the register access determination circuits #0 to #3.

The register access determination circuit #0 compares the information VM_n_M related to the virtual machines which access the respective memory area setting registers #0 to #3 output from the virtual machine scheduler 5 with the information related to the virtual machines which can access the respective memory areas #0 to #3 stored in the respective memory area allocation registers #0 to #3 (i.e., corresponding to the memory area setting registers #0 to #3) (see FIG. 6). For example, the register access determination circuit #0 compares the virtual machine VM#0 which can access the memory area setting register #0 corresponding to the memory area #0 with the information VM_n_M related to the virtual machine which accesses the memory area setting register output from the virtual machine scheduler 5.

When the information VM_n_M related to the virtual machine which accesses the memory area setting register matches the virtual machine VM#0 which can access the memory area #0 stored in the memory area allocation register #0, the register access determination circuit #0 determines that the virtual machine VM#0 is able to access the memory area setting register #0, and outputs a high-level signal "1" to the AND1_0. When the signal output from the register access determination circuit #0 is a high-level "1", the AND1_0 outputs the register address ADD_R and the write data WD_R output from the access decoding circuit 30 to the memory area setting register #0 without masking the register address ADD_R and the write data WD_R. In summary, the AND1_0 directly outputs the register address ADD_R and the write data WD_R output from the access decoding circuit 30 to the memory area setting register #0.

On the other hand, when the information VM_n_M related to the virtual machine which accesses the memory area setting register does not match the virtual machine VM#0 which can access the memory area #0 stored in the memory area allocation register #0, the register access determination circuit #0 determines that the access to the memory area setting register #0 by the virtual machine is prohibited, and outputs a low-level signal "0" to the AND1_0. When the signal output from the register access determination circuit #0 is low level "0", the AND1_0 masks the register address ADD_R and the write data WD_R output from the access decoding circuit 30.

The register access determination circuits #1 to #3 are similar to the register access determination circuit #0 described above.

Figure 11:
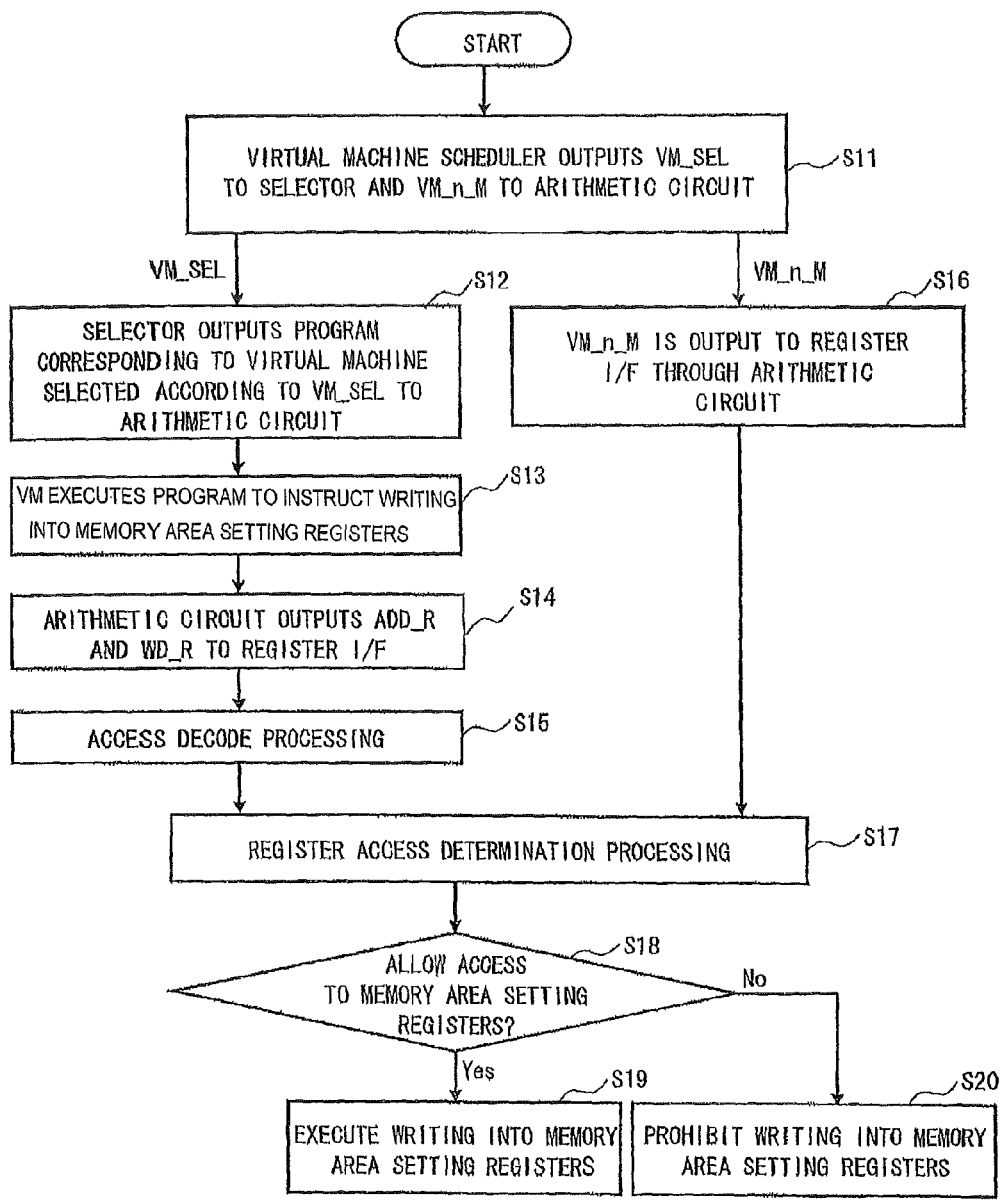
FIG. 11 is a flowchart for describing an operation of the memory protection circuit according to the second embodiment.

Next, an operation of the memory protection circuit 6_2 will be described. FIG. 11 is a flowchart for describing the operation of the memory protection circuit 6_2 according to this embodiment, and shows a flow when the virtual machines rewrite the information in the memory area setting registers #0 to #3.

The virtual machine scheduler 5 outputs the virtual machine selection signal VM_SEL that specifies the virtual machine to which execution time is allocated to the selector 3 according to a predetermined schedule. Further, the virtual machine scheduler 5 outputs the information VM_n_M related to the virtual machine corresponding to the program executed in the arithmetic circuit 4 to the arithmetic circuit 4 (step S11). The selector 3 outputs the program corresponding to the virtual machine selected according to the virtual machine selection signal VM_SEL to the arithmetic circuit 4 (step S12).

Then, the virtual machine (i.e., by arithmetic circuit 4) executes a program to instruct writing into the memory area setting registers #0 to #3 (step S13). When the program to instruct writing into the memory area setting registers #0 to #3 is executed, the virtual machine (i.e., by arithmetic circuit 4) outputs the register address ADD_R and the write data WD_R to the register I/F (7) of the memory protection circuit 6_2 (step S14).

The access decoding circuit 30 executes access decode processing (step S15). Specifically, the access decoding circuit 30 receives the register address ADD_R and the write data WD_R output from the virtual machine (i.e., by from arithmetic circuit 4), and outputs the register address ADD_R and the write data WD_R to the memory area setting registers #0 to #3 (i.e., via AND1_0 to AND1_3) corresponding to the received register address ADD_R.

Further, the information VM_n_M related to the virtual machines which access the memory area setting registers #0 to #3 output from the virtual machine scheduler 5 is output to the register I/F (7) through the arithmetic circuit 4 (step S16).

Next, the register access determination circuits #0 to #3 execute register access determination processing (step S17). Specifically, the register access determination circuits #0 to #3 determine whether to allow the virtual machines to access the memory area setting registers #0 to #3 based on the information related to the virtual machines which can access the respective memory area setting registers #0 to #3 stored in the respective memory area allocation registers #0 to #3 and the information VM_n_M related to the virtual machines which access the memory area setting registers #0 to #3.

When the register access determination circuits #0 to #3 allow the virtual machines to access the memory area setting registers #0 to #3 (step S18: Yes), the virtual machines (i.e., by arithmetic circuit 4) execute writing into the memory area setting registers #0 to #3 using the register address ADD_R and the write data WD_R (step S19).

Meanwhile, when the register access determination circuits #0 to #3 prohibit the access to the memory area setting registers #0 to #3 by the virtual machines (step S18: No), writing into the memory area setting registers #0 to #3 by the virtual machines (i.e., by arithmetic circuit 4) is prohibited (step S20).

Note that the configurations and the operations of the memory access information register 8 and the access determination circuit 9 included in the memory protection circuit 6_2 are similar to those in the first embodiment.

Third Embodiment

Figure 12:
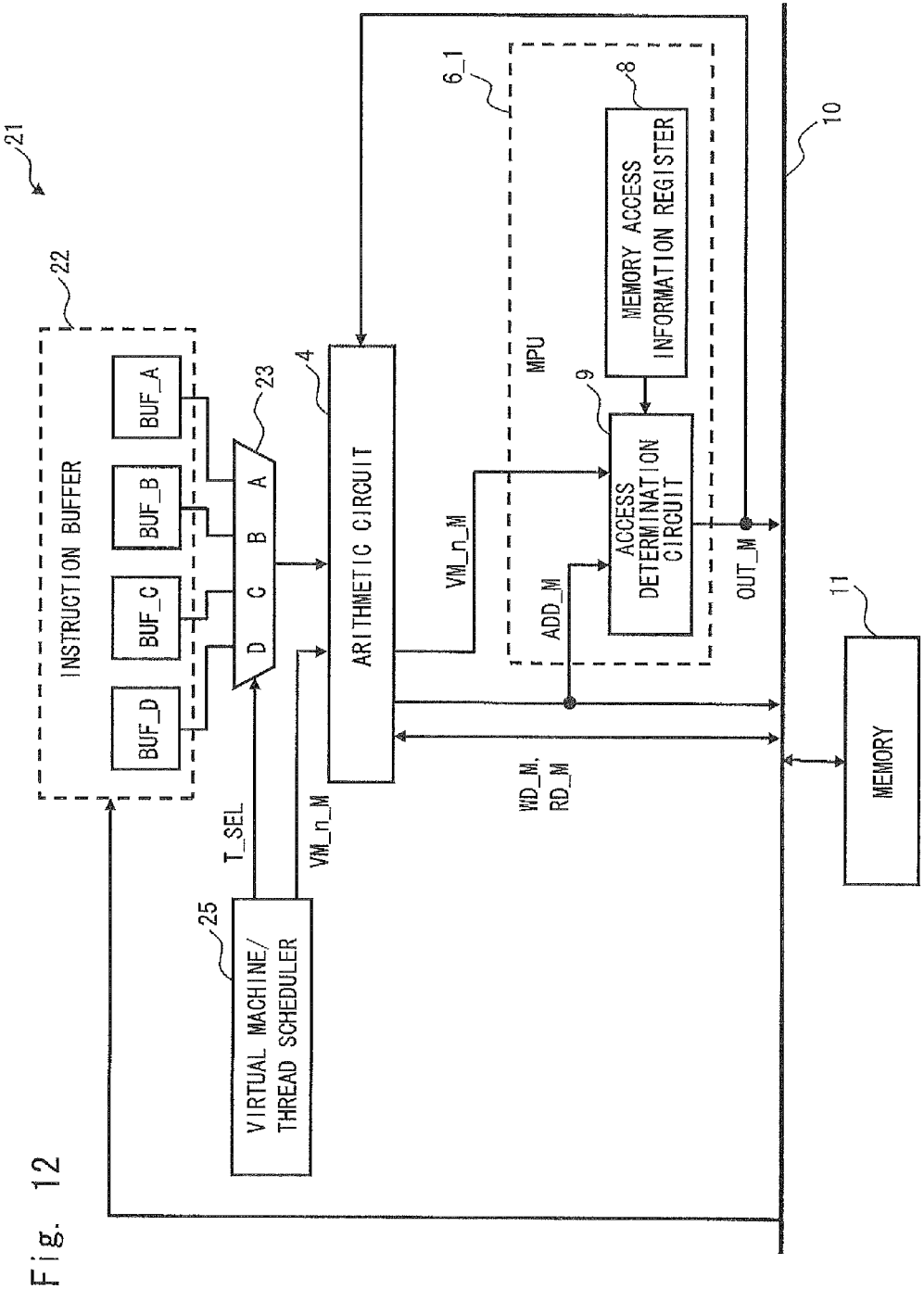
FIG. 12 is a block diagram for describing a processing unit including a memory protection circuit according to a third embodiment.

Next, a third embodiment will be described. FIG. 12 is a block diagram for describing a processing unit 21 including a memory protection circuit according to this embodiment. According to this embodiment, the configurations of an instruction buffer 22, a selector 23, and a virtual machine/thread scheduler 25 are different compared to the first and second embodiments. Other configurations are similar to those in the first embodiment. Thus, the same components are denoted by the same reference symbols, and overlapping description will be omitted.

The processing unit 21 shown in FIG. 12 includes the instruction buffer 22, the selector 23, an arithmetic circuit 4, the virtual machine/thread scheduler 25, and a memory protection circuit 6_1. The memory protection circuit 6_1 includes a memory access information register 8 and an access determination circuit 9.

The instruction buffer 22 temporarily stores instructions to be processed by the processing unit 21. The instruction buffer 22 includes instruction buffer areas BUF_A to BUF_D. The instruction buffer areas BUF_A to BUF_D temporarily store instructions corresponding to respective threads. Instructions may be supplied to the instruction buffer 22 through the bus 10, for example, or instructions stored in an instruction memory (not shown) may be supplied to the instruction buffer 22.

The selector 23 selects one of the instruction buffer areas BUF_A to BUF_D according to a thread selection signal T_SEL output from the virtual machine/thread scheduler 25, and outputs the instruction read out from the selected instruction buffer area to the arithmetic circuit 4. Specifically, the selector 23 selects one thread from a plurality of threads (thread A to thread D) according to the thread selection signal T_SEL, and outputs the instruction output from the selected thread to the arithmetic circuit 4. The instruction buffer areas BUF_A to BUF_D correspond to the thread A to the thread D, respectively.

The virtual machine/thread scheduler 25 outputs the thread selection signal T_SEL which specifies one thread to be executed in the next execution cycle from the plurality of threads according to a predetermined schedule. Specifically, the virtual machine/thread scheduler 25 schedules the order of instructions output from the instruction buffer areas BUF_A to BUF_D included in the instruction buffer 22, and outputs the thread selection signal T_SEL so that the instructions are executed in the arithmetic circuit 4 according to the scheduling. Further, the virtual machine/thread scheduler 25 outputs the information VM_n_M related to the virtual machine corresponding to the instruction executed in the arithmetic circuit 4 to the memory protection circuit 6_1 through the arithmetic circuit 4.

The arithmetic circuit 4 executes arithmetic processing based on the instruction selected by the selector 23. More specifically, the arithmetic circuit 4 includes a plurality of execution stages, and executes arithmetic processing by pipeline processing. Further, the arithmetic circuit 4 transmits the memory address ADD_M and the write data WD_M to access the memory 11, and receives the read data RD_M according to the result of executing the instruction. The memory address ADD_M and the write data WD_M transmitted from the arithmetic circuit 4 are supplied to the memory 11 through the bus 10.

Figure 13:
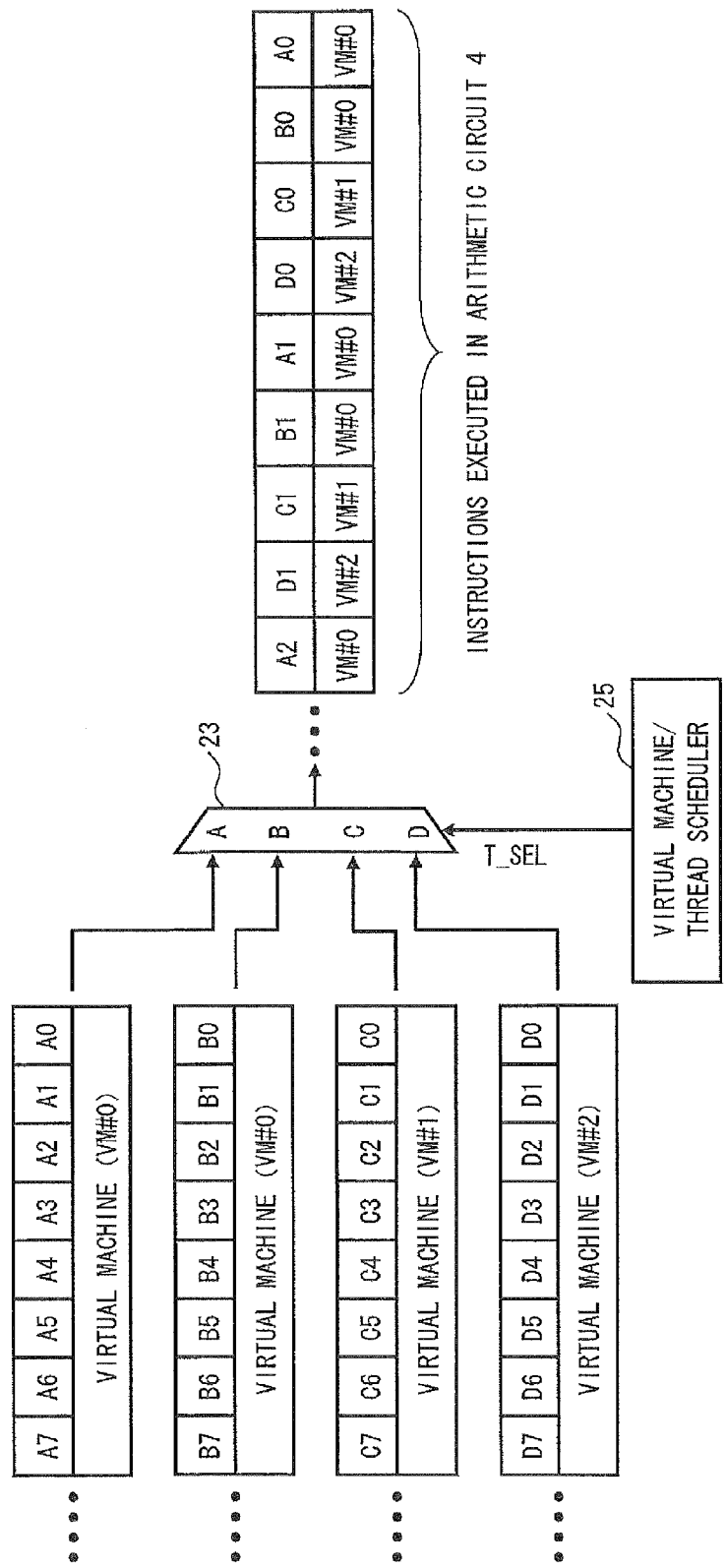
FIG. 13 is a diagram for describing one example of an order of instructions executed by an arithmetic circuit.

FIG. 13 is a diagram for describing one example of the order of instructions executed by the arithmetic circuit 4. Instructions A0 to A7 (corresponding to the thread A) shown in FIG. 13 are stored in the instruction buffer area BUF_A included in the instruction buffer 22. Similarly, instructions B0 to B7 (corresponding to the thread B) are stored in the instruction buffer area BUF_B. Instructions C0 to C7 (corresponding to the thread C) are stored in the instruction buffer area BUF_C. Instructions D0 to D7 (corresponding to the thread D) are stored in the instruction buffer area BUF_D.

FIG. 13 shows, as an example, a case in which the instructions A0 to A7 (thread A) and the instructions B0 to B7 (thread B) are executed on the virtual machine (VM#0), the instructions C0 to C7 (thread C) are executed on the virtual machine (VM#1), and the instructions D0 to D7 (thread D) are executed on the virtual machine (VM#2).

The selector 23 selects one of the instruction buffer areas BUF_A to BUF_D according to the thread selection signal T_SEL output from the virtual machine/thread scheduler 25, to output the instruction read out from the selected instruction buffer area to the arithmetic circuit 4. The example shown in FIG. 13 shows a case in which the instructions stored in the instruction buffer areas BUF_A to BUF_D are scheduled in the virtual machine/thread scheduler 25 so that they are output in the order of the instruction A0, the instruction B0, the instruction C0, the instruction D0, the instruction A1, . . . . In this way, by sequentially executing the instructions output from the selector 23 using the arithmetic circuit 4, it is possible to process the instructions in parallel on the plurality of virtual machines (VM#0 to VM#2).

The instructions (threads) processed by the virtual machines and the order of processing of the instructions (thread scheduling) shown in FIG. 13 are merely examples, and they may be arbitrarily determined.

In the first and second embodiments, the virtual machine scheduler 5 specifies the virtual machine to which execution time is allocated in the next execution period among a plurality of virtual machines according to a predetermined schedule. That is, the virtual machine scheduler 5 schedules the order of the virtual machines corresponding to the programs output from the instruction buffer areas BUF_0 to BUF_2 included in the instruction buffer 2, to output the virtual machine selection signal VM_SEL so that the programs are executed by the arithmetic circuit 4 according to this scheduling.

Meanwhile, in this embodiment, the virtual machine/thread scheduler 25 specifies one thread to be executed in the next execution cycle among the plurality of threads according to a predetermined schedule. Specifically, the virtual machine/thread scheduler 25 schedules the order of instructions output from the instruction buffer areas BUF_A to BUF_D included in the instruction buffer 22, to output the thread selection signal T_SEL so that the instructions are executed by the arithmetic circuit 4 according to this scheduling. At this time, the virtual machine/thread scheduler 25 outputs the information VM_n_M related to the virtual machine corresponding to the instruction executed in the arithmetic circuit 4 to the memory protection circuit 6_1 through the arithmetic circuit 4.

Other configurations and the operations are similar to those described in the first and second embodiments. Thus, overlapping description will be omitted.

Fourth Embodiment

Next, a fourth embodiment will be described. A memory protection circuit according to this embodiment is different from the memory protection circuits 6_1 and 6_2 according to the first to third embodiment in that only the hypervisor is authorized to access the memory area setting registers #0 to #3. Other points are similar to those in the first to third embodiments. Thus, the same components are denoted by the same reference symbols, and overlapping description will be omitted.

Figure 14:
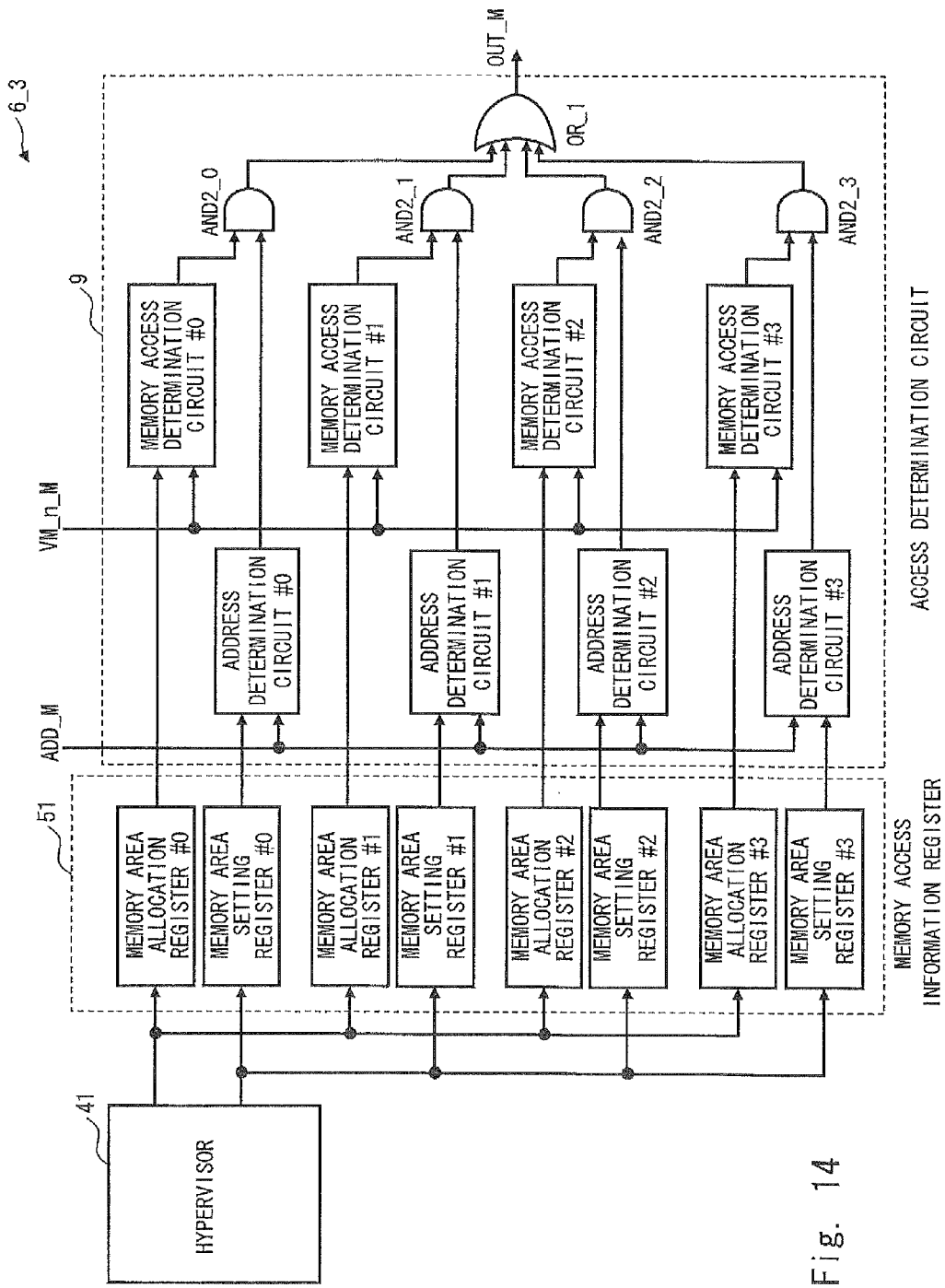
FIG. 14 is a block diagram showing one example of a memory protection circuit according to a fourth embodiment.

FIG. 14 is a block diagram showing one example of the memory protection circuit according to this embodiment. As shown in FIG. 14, a memory protection circuit 6_3 according to this embodiment includes a memory access information register 51 and an access determination circuit 9. The memory access information register 51 includes memory area allocation registers #0 to #3 and memory area setting registers #0 to #3. Further, the access determination circuit 9 includes address determination circuits #0 to #3, memory access determination circuits #0 to #3, AND circuits (AND2_0 to AND2_3), and an OR circuit (OR_1). The configuration and the operation of the access determination circuit 9 are similar to those of the access determination circuit 9 described in the first embodiment. Thus, overlapping description will be omitted.

The information related to the virtual machines which can access the respective memory areas #0 to #3 is stored in the respective memory area allocation registers #0 to #3 included in the memory access information register 51. Further, memory area information related to the memory areas #0 to #3 of the memory 11 is stored in the respective memory area setting registers #0 to #3. In the memory protection circuit 6_3 according to this embodiment, authorization to access the memory area setting registers #0 to #3 is granted to a hypervisor 41 in addition to authorization to access the memory area allocation registers #0 to #3.

Specifically, as is similar to the first embodiment, only the hypervisor 41 is authorized to access the memory area allocation registers #0 to #3, and each of the virtual machines (or supervisors associated with the virtual machines) is not authorized to access the memory area allocation registers #0 to #3, thereby being able to prevent each of the virtual machines from freely rewriting information in the memory area allocation registers #0 to #3. Further, in the memory protection circuit 6_3 according to this embodiment, only the hypervisor 41 is authorized to access the memory area setting registers #0 to #3, and each of the virtual machines (or supervisors associated with the virtual machines) is not authorized to access the memory area setting registers #0 to #3, thereby being able to prevent each of the virtual machines from rewriting information in the memory area setting registers #0 to #3. According to such a configuration, it is possible for the hypervisor to manage the memory areas used by the respective virtual machines more strictly, and it is possible to prevent interference of the memory areas used by the respective virtual machines more securely.

Other configurations and the operations of the memory access information register 51 are similar to those of the memory access information register 8 described in the first embodiment. Thus, overlapping description will be omitted.

Also in this embodiment, it is possible to provide a memory protection circuit, a processing unit, and a memory protection method that are capable of controlling access to memory by each of a plurality of virtual machines with a small amount of hardware resources.

Fifth Embodiment

Next, a fifth embodiment will be described. In a memory protection circuit according to this embodiment, configurations and operations of a memory access information register and an access determination circuit are different from those of the memory access information register 8 and the access determination circuit 9 included in the memory protection circuits 6_1 and 6_2 described in the first to third embodiments. Other points are similar to those in the first to third embodiment. Thus, overlapping description will be omitted as appropriate.

Figure 15:
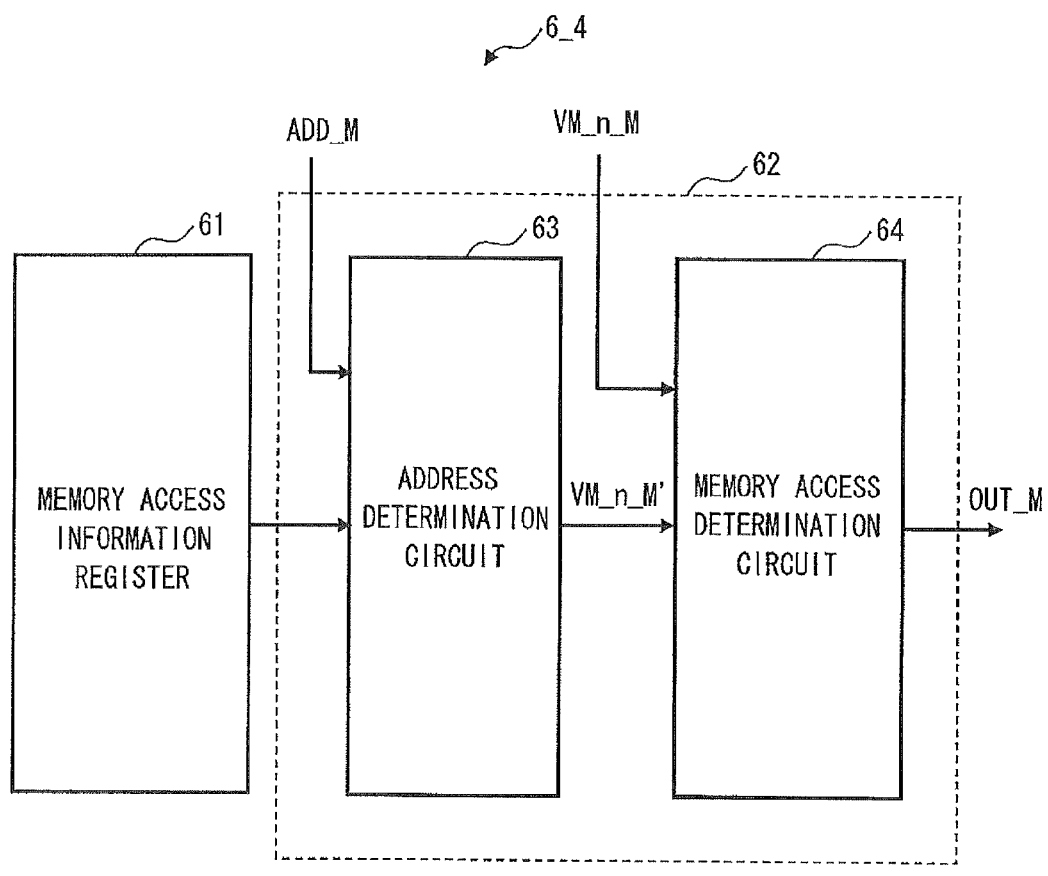
FIG. 15 is a block diagram showing one example of a memory protection circuit according to a fifth embodiment.

FIG. 15 is a block diagram showing one example of the memory protection circuit according to this embodiment. As shown in FIG. 15, a memory protection circuit 6_4 according to this embodiment includes a memory access information register 61 and an access determination circuit 62. The access determination circuit 62 includes an address determination circuit 63 and a memory access determination circuit 64.

The memory access information register 61 stores memory access information related to the memory areas which can be accessed by the respective virtual machines. FIG. 16 is a table showing one example of information stored in the memory access information register 61 included in the memory protection circuit 6_4 according to this embodiment. As shown in FIG. 16, memory areas #0 to #3, address ranges corresponding to the respective memory areas #0 to #3, and information related to the virtual machines which can access the respective memory areas #0 to #3 are stored in the memory access information register 61. As shown in FIG. 16, the address range of the memory area #0 is an address a to an address b, and the virtual machine VM#0 can access the memory area #0. The address range of the memory area #1 is an address c to an address d, and the virtual machine VM#0 can access the memory area #1. The address range of the memory area #2 is an address e to an address f, and the virtual machine VM#1 can access the memory area #2. The address range of the memory area #3 is an address g to an address h, and the virtual machine VM#2 can access the memory area #3.

Only the hypervisor is authorized to access the memory access info nation register 61, and each of the virtual machines (or supervisors associated with the virtual machines) is not authorized to access the memory access information register 61, thereby being able to prevent each of the virtual machines from freely rewriting the memory access information stored in the memory access information register 61. Accordingly, it is possible for the hypervisor to manage the memory areas used by the respective virtual machines, and it is possible to prevent interference of the memory areas used by the respective virtual machines.

The address determination circuit 63 included in the access determination circuit 62 outputs information VM_n_M' related to the virtual machine which is allowed to access the memory area corresponding to the memory address ADD_M output from each of the virtual machines when accessing the memory 11 based on the memory access information stored in the memory access information register 61.

For example, the address determination circuit 63 compares the memory address ADD_M output from each of the virtual machines VM#0 to VM#2 when accessing the memory 11 with the memory access information stored in the memory access information register 61 (specifically, address range in FIG. 16). Then the address determination circuit 63 outputs the information VM_n_M' related to the virtual machine corresponding to the address range including the memory address ADD_M to the memory access determination circuit 64. For example, when the memory address ADD_M is included in the range of the address a to the address b, the address determination circuit 63 outputs information VM_0_M' related to the virtual machine VM#0 corresponding to this address range to the memory access determination circuit 64.

The memory access determination circuit 64 determines whether to allow the virtual machine to access the memory 11 based on the information VM_n_M' related to the virtual machine which is allowed to access the memory area output from the address determination circuit 63 and the information VM_n_M related to the virtual machine that accesses the memory 11 output from each of the virtual machines when accessing the memory 11.

The information VM_n_M related to the virtual machine that accesses the memory 11 is supplied from the virtual machine scheduler 5 (see FIG. 1) or the virtual machine/thread scheduler 25 (see FIG. 12). Specifically, the virtual machine scheduler 5 (in the case of the third embodiment, the virtual machine/thread scheduler 25) holds information related to the virtual machine corresponding to the instruction executed in the arithmetic circuit 4. Accordingly, the virtual machine scheduler 5 is able to output the information VM_n_M related to the virtual machine that accesses the memory 11 to the memory access determination circuit 64.

The memory access determination circuit 64 compares the information VM_n_M related to the virtual machine that accesses the memory 11 output from the virtual machine scheduler 5 with the information VM_n_M' related to the virtual machine which is allowed to access the memory area output from the address determination circuit 63. When VM_n_M output from the virtual machine scheduler 5 matches VM_n_M' output from the address determination circuit 63, the memory access determination circuit 64 determines that the virtual machine is able to access the memory 11, and outputs a high-level signal indicating access permission as the memory access determination result OUT_M. Meanwhile, when VM_n_M output from the virtual machine scheduler 5 does not match VM_n_M' output from the address determination circuit 63, the memory access determination circuit 64 determines that the access to the memory 11 by the virtual machine is prohibited, and outputs a low-level signal indicating access prohibition as the memory access determination result OUT_M.

The memory access determination result OUT_M output from the memory protection circuit 6_4 is supplied to the memory 11 through the bus 10 shown in FIG. 1, for example. When the memory access determination result OUT_M indicates access prohibition (i.e., in the case of low level), the memory 11 disables the access to the memory 11 by the virtual machine (i.e., by arithmetic circuit 4). Meanwhile, when the memory access determination result OUT_M indicates access permission (i.e., in the case of high level), the memory 11 enables the access to the memory 11 by the virtual machine (i.e., by arithmetic circuit 4).

The memory access determination result OUT_M output from the memory protection circuit 6_4 may be supplied to the arithmetic circuit 4, for example. In this case, when the memory access determination result OUT_M indicates access prohibition (i.e., in the case of low level), the arithmetic circuit 4 disables the access to the memory 11 by the virtual machine. Meanwhile, when the memory access determination result OUT_M indicates access permission (i.e., in the case of high level), the arithmetic circuit 4 enables the access to the memory 11 by the virtual machine.

Next, the access determination in the access determination circuit 62 will be described in detail. First, as an example, a case in which the virtual machine VM#0 accesses the memory area #2 will be described. When the virtual machine VM#0 tries to access the memory area #2, the arithmetic circuit 4 outputs the memory address ADD_M corresponding to the memory area #2 to the address determination circuit 63. Since the memory address ADD_M is included in the address range corresponding to the memory area #2 (address e to address f), the address determination circuit 63 outputs information VM_1_M' related to the virtual machine VM#1 corresponding to this address range to the memory access determination circuit 64.

Further, the virtual machine scheduler 5 outputs the information VM_0_M indicating the virtual machine VM#0 to the memory access determination circuit 64 as the information VM_n_M related to the virtual machine that accesses the memory 11. The memory access determination circuit 64 compares the information VM_0_M related to the virtual machine VM#0 which accesses the memory 11 output from the virtual machine scheduler 5 with the information VM_1_M' related to the virtual machine VM#1 which is allowed to access the memory area #2 output from the address determination circuit 63.

In this case, VM_0_M output from the virtual machine scheduler 5 does not match VM_1_M' output from the address determination circuit 63. Thus, the memory access determination circuit 64 determines that the access to the memory area #2 by the virtual machine VM#0 is prohibited, and outputs a low-level signal indicating access prohibition as the memory access determination result OUT_M. In this way, the access to the memory area #2 by the virtual machine VM#0 is prohibited.

Another example in which the virtual machine VM#2 accesses the memory area #3 will be described. When the virtual machine VM#2 tries to access the memory area #3, the arithmetic circuit 4 outputs the memory address ADD_M corresponding to the memory area #3 to the address determination circuit 63. Since the memory address ADD_M is included in the address range corresponding to the memory area #3 (address g to address h), the address determination circuit 63 outputs the information VM_2_M' related to the virtual machine VM#2 corresponding to the address range to the memory access determination circuit 64.

Further, the virtual machine scheduler 5 outputs the information VM_2_M indicating the virtual machine VM#2 to the memory access determination circuit 64 as the information VM_n_M related to the virtual machine that accesses the memory 11. The memory access determination circuit 64 compares the information VM_2_M related to the virtual machine VM#2 which accesses the memory 11 output from the virtual machine scheduler 5 with the information VM_2_M' related to the virtual machine VM#2 which is allowed to access the memory area #3 output from the address determination circuit 63.

In this case, since VM_2_M output from the virtual machine scheduler 5 matches VM_2_M' output from the address determination circuit 63, the memory access determination circuit 64 determines that the virtual machine VM#2 is allowed to access the memory area #3, and outputs a high-level signal indicating access permission as the memory access determination result OUT_M. In this way, the virtual machine VM#2 is allowed to access the memory area #3.

According to this embodiment stated above, it is possible to provide a memory protection circuit, a processing unit, and a memory protection method that are capable of controlling access to memory by each of a plurality of virtual machines with a small amount of hardware resources.

Sixth Embodiment

Next, a sixth embodiment will be described. A memory protection circuit according to this embodiment is different from that of the fifth embodiment in that a register I/F is added to the memory protection circuit 6_4 described in the fifth embodiment. Other components are similar to those of the fifth embodiment. Thus, overlapping description will be omitted as appropriate.

Figure 17:
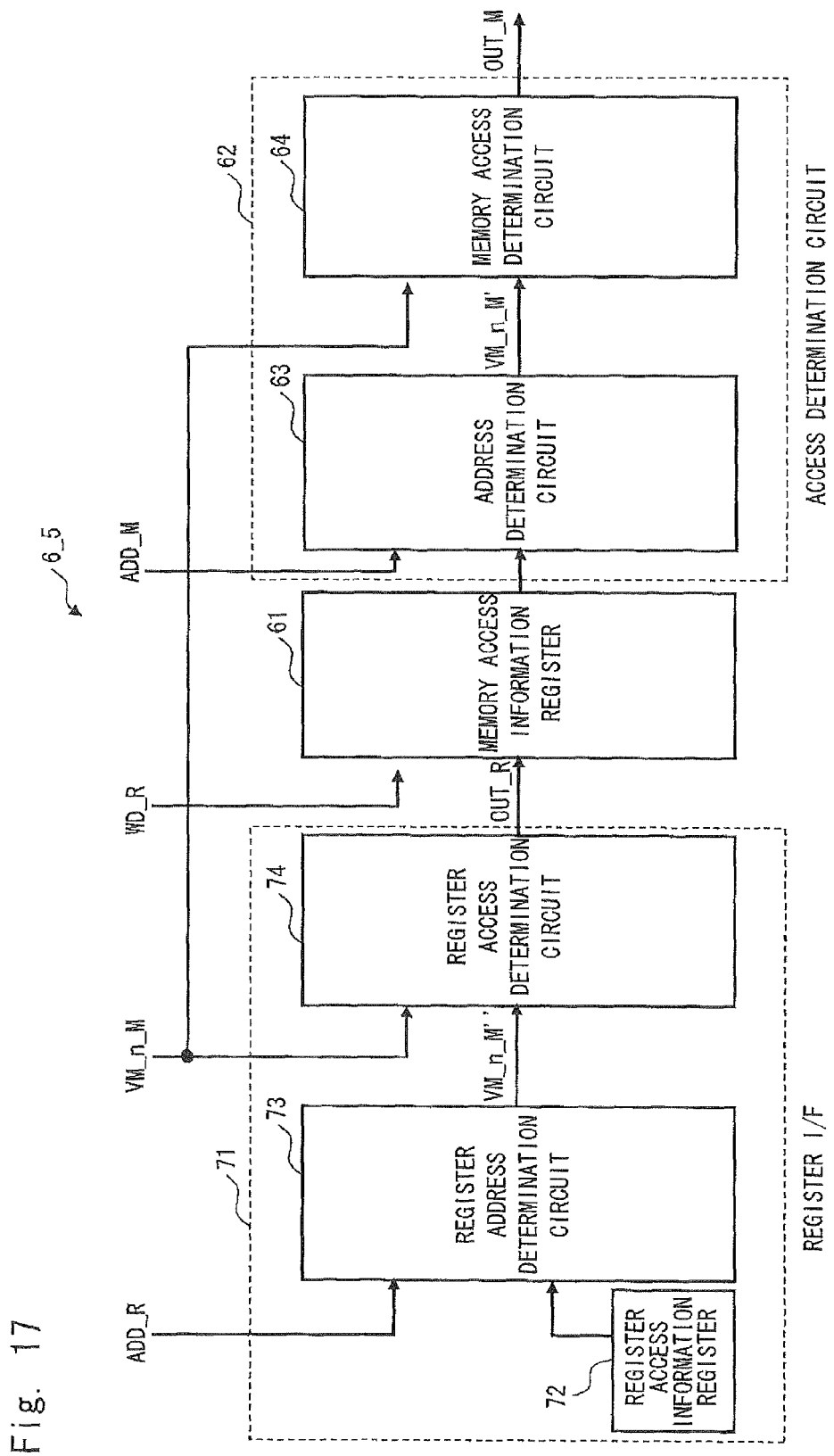
FIG. 17 is a block diagram showing one example of a memory protection circuit according to a sixth embodiment.

FIG. 17 is a block diagram showing one example of the memory protection circuit according to this embodiment. As shown in FIG. 17, a memory protection circuit 6_5 according to this embodiment includes a register I/F (71), a memory access information register 61, and an access determination circuit 62. The configurations and the operations of the memory access information register 61 and the access determination circuit 62 are similar to those of the memory access information register 61 and the access determination circuit 62 described in the fifth embodiment. Thus, overlapping description will be omitted.

In the memory protection circuit 6_5 according to this embodiment, a part of the memory access information stored in the memory access information register 61 may be rewritten by each of a plurality of virtual machines. The access to the memory access information register 61 by each of the virtual machines is restricted by the register I/F (71). The details will be described below.

The register I/F (71) includes a register access information register 72, a register address determination circuit 73, and a register access determination circuit 74. The register access information related to the memory access information register area which can be accessed by each of the virtual machines is stored in the register access information register 72. The memory access information register area is a plurality of register areas included in the memory access information register 61.

FIG. 18 is a table showing one example of information stored in the register access information register 72 included in the memory protection circuit 6_5 according to this embodiment. As shown in FIG. 18, memory areas #0 to #3, register address ranges storing the information related to the respective memory areas #0 to #3, and information related to the virtual machines which can access the memory areas #0 to #3 are stored in the register access information register 72. The information related to the respective memory areas

0 to #3 is the address ranges corresponding to the memory areas #0 to #3 shown in the table in FIG. 16. Further, the register address ranges storing the information related to the respective memory areas #0 to #3 are the register address ranges of the memory access information register 61 storing the address ranges corresponding to the memory areas #0 to #3 shown in the table in FIG. 16. For example, the register address range storing the information related to the memory area #0 is the register address range (register address a' to register address b') of the memory access information register 61 in which the address range corresponding to the memory area #0 (address a to address b) shown in the table in FIG. 16 is stored.

As shown in FIG. 18, the register address range of the memory area #0 is a register address a' to a register address b', and the virtual machine VM#0 is able to access the area where the information related to the memory area #0 is stored in the memory access information register 61 (i.e., register address a' to register address b'). The register address range of the memory area #1 is a register address c' to a register address d', and the virtual machine VM#0 is able to access the area where the information related to the memory area #1 is stored in the memory access information register 61 (i.e., register address c' to register address d'). The register address range of the memory area #2 is a register address e' to a register address f', and the virtual machine VM#1 is able to access the area where the information related to the memory area #2 is stored in the memory access information register 61 (i.e., register address e' to register address f'). The register address range of the memory area #3 is a register address g' to a register address h', and the virtual machine VM#2 is able to access the area where the information related to the memory area #3 is stored in the memory access information register 61 (register address g' to register address h').

In this embodiment, the virtual machines are able to rewrite only the information related to the address ranges corresponding to the memory areas #0 to #3 shown in the table in FIG. 16, and cannot rewrite information related to the virtual machines which can access the respective memory areas #0 to #3. In summary, only the hypervisor can rewrite information related to the virtual machines which can access the respective memory areas #0 to #3.

Only the hypervisor is authorized to access the register access information register 72, and each of the virtual machines (or supervisors associated with the virtual machines) is not authorized to access the register access information register 72, thereby being able to prevent each of the virtual machines from freely rewriting the register access information stored in the register access information register 72. Accordingly, it is possible for the hypervisor to manage the memory areas used by the respective virtual machines, and it is possible to prevent interference of the memory areas used by the respective virtual machines.

The register address determination circuit 73 and the register access determination circuit 74 form a second access determination circuit. The second access determination circuit determines whether to allow the virtual machine to access the memory access information register 61 based on the register address ADD_R when each of the virtual machines accesses the memory access information register 61, the information VM_n_M related to the virtual machine which accesses the memory access information register 61, and the register access information stored in the register access information register 72.

Specifically, the register address determination circuit 73 outputs information VM_n_M" related to the virtual machine which is allowed to access the register area corresponding to the register address ADD_R output from each of the virtual machines when accessing the memory access information register 61 based on the register access information.

For example, the register address determination circuit 73 compares the register address ADD_R output from each of the virtual machines VM#0 to VM#2 when accessing the memory access information register 61 with the register access information stored in the register access information register 72 (specifically, the register address range in FIG. 18). Then, the register address determination circuit 73 outputs the information VM_n_M" related to the virtual machine corresponding to the register address range including the register address ADD_R to the register access determination circuit 74. For example, when the register address ADD_R is included in the range of the register address a' to the register address b', the register address determination circuit 73 outputs information VM_0_M" related to the virtual machine VM#0 corresponding to the register address range to the register access determination circuit 74.

The register access determination circuit 74 determines whether to allow the virtual machine to access the memory access information register 61 based on the information VM_n_M" related to the virtual machine which is allowed to access the memory access information register area output from the register address determination circuit 73 and the information VM_n_M related to the virtual machine which accesses the memory access information register 61 output from each of the virtual machines when accessing the memory access information register 61.

The information VM_n_M related to the virtual machine which accesses the memory access information register 61 is supplied from the virtual machine scheduler 5 (see FIG. 1) or the virtual machine/thread scheduler 25 (see FIG. 12). Specifically, the virtual machine scheduler 5 (in the third embodiment, the virtual machine/thread scheduler 25) holds information related to the virtual machine corresponding to the instruction executed in the arithmetic circuit 4. Thus, the virtual machine scheduler 5 is able to output the information VM_n_M related to the virtual machine which accesses the memory access information register 61 to the register access determination circuit 74.

The register access determination circuit 74 compares the information VM_n_M related to the virtual machine which accesses the memory access information register 61 output from the virtual machine scheduler 5 with the information VM_n_M" related to the virtual machine which is allowed to access the memory access information register area output from the register address determination circuit 73. When VM_n_M output from the virtual machine scheduler 5 matches VM_n_M" output from the register address determination circuit 73, the register access determination circuit 74 determines that the virtual machine can access the memory access information register 61, and outputs a high-level signal indicating access permission as a register access determination result OUT_R. Meanwhile, VM_n_M output from the virtual machine scheduler 5 does not match VM_n_M" output from the register address determination circuit 73, the register access determination circuit 74 determines that the access to the memory access information register 61 by the virtual machine is prohibited, and outputs a low-level signal indicating access prohibition as the register access determination result OUT_R.

The register access determination result OUT_R output from the register access determination circuit 74 is supplied to the memory access information register 61. When the register access determination result OUT_R indicates access prohibition (i.e., in the case of low level), the memory access information register 61 disables the access WD_R by the virtual machine (i.e., by arithmetic circuit 4). Meanwhile, when the register access determination result OUT_R indicates access permission (i.e., in the case of high level), the memory access information register 61 enables the access WD_R by the virtual machine (i.e., by arithmetic circuit 4).

The register access determination result OUT_R output from the register access determination circuit 74 may be supplied to the arithmetic circuit 4, for example. In this case, when the register access determination result OUT_R indicates access prohibition (i.e., in the case of low level), the arithmetic circuit 4 disables the access WD_R to the memory access information register 61 by the virtual machine. When the register access determination result OUT_R indicates access permission (i.e., in the case of high level), the arithmetic circuit 4 enables the access WD_R to the memory access information register 61 by the virtual machine.

Next, the access determination in the register I/F (71) will be described in detail. First, as an example, a case will be described in which the virtual machine VM#0 accesses the register address range storing the information related to the memory area #2 (hereinafter referred to as the register address range corresponding to the memory area #2). When the virtual machine VM#0 tries to access the register address range corresponding to the memory area #2, the arithmetic circuit 4 outputs the address ADD_R corresponding to the register address range corresponding to the memory area #2 (register address e' to register address f') to the register address determination circuit 73. Since the address ADD_R is included in the register address range corresponding to the memory area #2 (register address e' to register address f'), the register address determination circuit 73 outputs information VM_1_M" related to the virtual machine VM#1 corresponding to this register address range to the register access determination circuit 74.

Further, the virtual machine scheduler 5 outputs the information VM_0_M indicating the virtual machine VM#0 to the register access determination circuit 74 as the information VM_n_M related to the virtual machine which accesses the memory access information register 61. The register access determination circuit 74 compares VM_0_M output from the virtual machine scheduler 5 with VM_1_M" output from the register address determination circuit 73.

In this case, VM_0_M output from the virtual machine scheduler 5 does not match VM_1_M" output from the register address determination circuit 73. Accordingly, the register access determination circuit 74 determines that the access to the register address range corresponding to the memory area #2 (register address e' to register address f') by the virtual machine VM#0 is prohibited, and outputs a low-level signal indicating access prohibition as the register access determination result OUT_R. In this way, the access to the register address range corresponding to the memory area #2 (register address e' to register address f') by the virtual machine VM#0 is prohibited.

Another example in which the virtual machine VM#2 accesses the register address range corresponding to the memory area #3 will be described. When the virtual machine VM#2 tries to access the register address range corresponding to the memory area #3 (register address g' to register address h'), the arithmetic circuit 4 outputs the address ADD_R corresponding to the register address range corresponding to the memory area #3 (register address g' to register address h') to the register address determination circuit 73. Since the register address ADD_R is included in the register address range corresponding to the memory area #3 (register address g' to register address h'), the register address determination circuit 73 outputs the information VM_2_M" related to the virtual machine VM#2 corresponding to the register address range to the register access determination circuit 74.

Further, the virtual machine scheduler 5 outputs the information VM_2_M indicating the virtual machine VM#2 to the register access determination circuit 74 as the information VM_n_M related to the virtual machine which accesses the memory access information register 61. The register access determination circuit 74 compares VM_2_M output from the virtual machine scheduler 5 with VM_2_M" output from the register address determination circuit 73.

In this case, since VM_2_M output from the virtual machine scheduler 5 matches VM_2_M" output from the register address determination circuit 73, the register access determination circuit 74 determines that the virtual machine VM#2 is allowed to access the register address range corresponding to the memory area #3 (register address g' to register address h'), and outputs a high-level signal indicating access permission as the register access determination result OUT_R. In this way, the virtual machine VM#2 is allowed to access the register address range corresponding to the memory area #3 (register address g' to register address h').

According to the embodiments described above, it is possible to provide a memory protection circuit, a processing unit, and a memory protection method that are capable of controlling access to memory by each of a plurality of virtual machines with a small amount of hardware resources.

The first to sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A memory protection circuit comprising:
   a memory access information register that stores memory access information related to memory areas of a memory which can be accessed by a plurality of virtual machines; and
   a first access determination circuit that determines whether to allow a virtual machine from among the plurality of virtual machines to access the memory areas based on a memory address when each of the plurality of virtual machines accesses the memory, information related to the plurality of virtual machines which access the memory, and the memory access information stored in the memory access information register,
   wherein the information related to the virtual machines which access the memory is output from a virtual machine scheduler that allocates execution time of programs to the virtual machines and determines an order of the virtual machines to be processed.

2. The memory protection circuit according to claim 1, wherein the memory access information register comprises:
   a plurality of memory area setting registers storing memory area information related to respective memory areas and provided corresponding to the respective memory areas; and
   a plurality of memory area allocation registers storing information related to the virtual machines which can access the respective memory areas and provided corresponding to the respective memory areas.

3. The memory protection circuit according to claim 2, wherein the first access determination circuit comprises:
   address determination circuits that are provided corresponding to respective memory area setting registers and determine whether the memory address output from each of the virtual machines when accessing the memory is included in the memory areas based on the memory area information stored in respective memory area setting registers, and
   memory access determination circuits that are provided corresponding to respective address determination circuits, and that mask determination results in the address determination circuits based on the information related to the virtual machines which can access respective memory areas stored in respective memory area allocation registers and the information related to the virtual machines which access the memory.

4. The memory protection circuit according to claim 2, further comprising register access determination circuits that are provided corresponding to respective memory area setting registers, and determine whether to allow the virtual machines to access the memory area setting registers based on the information related to virtual machines which can access respective memory area setting registers stored in respective memory area allocation registers and information related to the virtual machines which access the memory area setting registers.

5. The memory protection circuit according to claim 2, wherein a hypervisor that manages each of the virtual machines is authorized to access the memory area allocation registers.

6. The memory protection circuit according to claim 2, wherein a hypervisor that manages each of the virtual machines is authorized to access the memory area allocation registers and the memory area setting registers.

7. The memory protection circuit according to claim 1, wherein the information related to the virtual machines which access the memory is output from the virtual machine scheduler which determines an order of instructions to be executed in the respective virtual machines.

8. The memory protection circuit according to claim 1, wherein the first access determination circuit comprises:
   an address determination circuit that outputs information related to virtual machines that are allowed to access the memory areas corresponding to the memory address that is output from each of the virtual machines when accessing the memory based on the memory access information; and
   a memory access determination circuit that determines whether to allow the virtual machines to access the memory based on the information related to the virtual machines that are allowed to access the memory areas output from the address determination circuit and the information related to the virtual machines which access the memory.

9. The memory protection circuit according to claim 8, wherein the information related to the virtual machines which access the memory is output from a virtual machine scheduler that allocates execution time of programs to the virtual machines and determines an order of the virtual machines to be processed.

10. The memory protection circuit according to claim 8, wherein the information related to the virtual machines which access the memory is output from the virtual machine scheduler which determines an order of instructions to be executed in the respective virtual machines.

11. The memory protection circuit according to claim 1, further comprising:
    a register access information register which stores further register access information related to a memory access information register area which can be accessed by each of the virtual machines; and
    a second access determination circuit which determines whether to allow the virtual machine to access the memory access information register based on a register address when each of the virtual machines accesses the memory access information register, information related to the virtual machines that access the memory access information register, and the register access information stored in the register access information register.

12. The memory protection circuit according to claim 11, wherein the second access determination circuit comprises:
    a register address determination circuit that outputs information related to virtual machines that are allowed to access a register area corresponding to a register address output when each of the virtual machines accesses the memory access information register based on the register access information; and
    a register access determination circuit that determines whether to allow the virtual machines to access the memory access information register based on the information related to the virtual machines that are allowed to access the register area of the memory access information register output from the register address determination circuit, and information related to virtual machines which access the memory access information register output from each of the virtual machines when accessing the memory access information register.

13. The memory protection circuit according to claim 1, wherein the virtual machine scheduler schedules the order of virtual machines corresponding to the programs output from the memory areas, and outputs a virtual machine selection signal so that the programs are executed by an arithmetic circuit according to the order scheduled by the virtual machine scheduler.

14. The memory protection circuit according to claim 13, wherein the virtual machine scheduler outputs information related to the virtual machine corresponding to the program executed in the arithmetic circuit to the memory protection circuit through the arithmetic circuit.

15. A processing unit comprising:
    an arithmetic circuit that executes programs corresponding to a plurality of virtual machines, respectively;
    a virtual machine scheduler that allocates execution time of the programs to the plurality of virtual machines; and
    a memory protection circuit that controls access to a memory of the processing unit by each of the plurality of virtual machines, wherein
    the memory protection circuit comprises:
    a memory access information register that stores memory access information related to a memory area of the memory that can be accessed by each of the virtual machines; and
    a first access determination circuit that determines whether to allow a virtual machine from among the plurality of virtual machines to access the memory based on a memory address when each of the plurality of virtual machines accesses the memory, information related to the plurality of virtual machines which access the memory, and the memory access information stored in the memory access information register, wherein the information related to the virtual machines which access the memory is output from the virtual machine scheduler that allocates execution time of programs to the virtual machines and determines an order of the virtual machines to be processed.

16. A memory protection method comprising:

storing in a memory access information register memory access information related to a memory area that can be accessed by each of a plurality of virtual machines; and determining whether to allow the plurality of virtual machines to access a memory based on a memory address when each of the plurality of virtual machines accesses the memory, information related to the plurality of virtual machines which access the memory, and the memory access information stored in the memory access information register, wherein the information related to the virtual machines which access the memory is output from a virtual machine scheduler that allocates execution time of programs to the virtual machines and determines an order of the virtual machines to be processed.

* * * * *